United States Patent [19]

Hull, Jr. et al.

[11] Patent Number: 4,989,113

[45] Date of Patent: Jan. 29, 1991

[54] DATA PROCESSING DEVICE HAVING DIRECT MEMORY ACCESS WITH IMPROVED TRANSFER CONTROL

[75] Inventors: Charles G. Hull, Jr., Rosenberg; Laurence R. Simar, Jr., Richmond; James F. Potts, Houston; Kim Asal, Sugarland, all of Tex.

[73] Assignee: Texas Instruments Incorporated, Dallas, Tex.

[21] Appl. No.: 138,419

[22] Filed: Dec. 28, 1987

Related U.S. Application Data

[63] Continuation-in-part of Ser. No. 25,443, Mar. 13, 1987.

[51] Int. Cl.$^5$ ............................................. G06F 13/28
[52] U.S. Cl. ................................ 364/200; 364/242.3; 364/242.33
[58] Field of Search ... 364/200 MS File, 900 MS File

[56] References Cited

U.S. PATENT DOCUMENTS

| | | | |
|---|---|---|---|
| 3,757,306 | 9/1973 | Boone | 340/172.5 |
| 4,074,351 | 2/1978 | Boone et al. | 364/200 |
| 4,075,691 | 2/1978 | Davis et al. | 364/200 |
| 4,528,626 | 7/1985 | Dean et al. | 364/200 |
| 4,577,282 | 3/1986 | Caudel et al. | 364/200 |
| 4,688,166 | 8/1987 | Schneider | 364/200 |
| 4,782,439 | 11/1988 | Barkar et al. | 364/200 |
| 4,797,853 | 1/1989 | Savage et al. | 364/200 |
| 4,847,750 | 7/1989 | Daniel | 364/200 |
| 4,908,748 | 3/1990 | Pathak et al. | 364/200 |

OTHER PUBLICATIONS

P. Kogge, *The Architecture of Pipelined Computers*, McGraw-Hill Book Company, pp. 38-47, 1981.

M. Yano et al., "An LSI Digital Signal Processor", IEEE, 1982, pp. 1073-1076.

NEC Electronics U.S.A. Inc., 1982 Catalog, pp. 551-567.

H. Kikuchi et al., "A 23K Gate CMOS DSP with 100ns Multiplication", IEEE International Solid-State Circuits Conference, 1983, pp. 128-129.

R. Kershaw et al., "A Programmable Digital Signal Processor with 32b Floating Point Arithmetic", IEEE International Solid-State Circuits Conference, 1985, pp. 92-93, 318.

Y. Mochida et al., "A High Performance LSI Digital Signal Processor for Communication", IEEE Journal on Selected Areas in Communications, vol. SAC-3, No. 2, 1985, pp. 347-356.

H. Yamauchi et al., "An 18-Bit Floating-Point Signal Processor VLSI with an On-Chip 512W Dual-Port RAM", IEEE, 1985, paper 6.4, pp. 204-207.

W. Hays et al., "A 32-Bit VLSI Digital Signal Processor", IEEE Journal of Solid-State Circuits, vol. SC-20, No. 5, 1985, pp. 998-1004.

*Microsystem Components Handbook-Microprocessors Volume I*, Intel Corporation, 1985, pp. 3.52-3.57, 3.72-3.75.

*Primary Examiner*—Michael R. Fleming
*Assistant Examiner*—Debra A. Chun
*Attorney, Agent, or Firm*—James F. Hollander; Thomas W. Demond; Melvin Sharp

[57] ABSTRACT

A microcomputer is disclosed which provides for a dedicated DMA data and address bus connecting an on-chip DNA controller with on-chip memories, and with on-chip ports for access to external memory and input/output devices. The DMA controller contains a control register which has two start bits, capable of representing four start codes. The four start codes allow for the unconditional starting and aborting of a DMA transfer, as well as for stopping the DMA after the current read or write operation, or after the next write operation (i.e., completion of a data word transfer). The control register also contains two status bits which the DMA controller writes with the status of the DMA operation, and also contains two synchronization bits for synchronizing the DMA operation in the source, destination, or source and destination modes (or not at all). Two interrupt enable registers are provided in the microcomputer, for independently enabling interrupts for the CPU and the DMA. In any of the synchronization modes, the DMA will suspend its operation awaiting an interrupt which is not enabled for the CPU but which is enabled for purposes of DMA. The use of system interrupts for DMA synchronization does not require dedicated DMA interrupt terminals for the microcomputer.

40 Claims, 14 Drawing Sheets

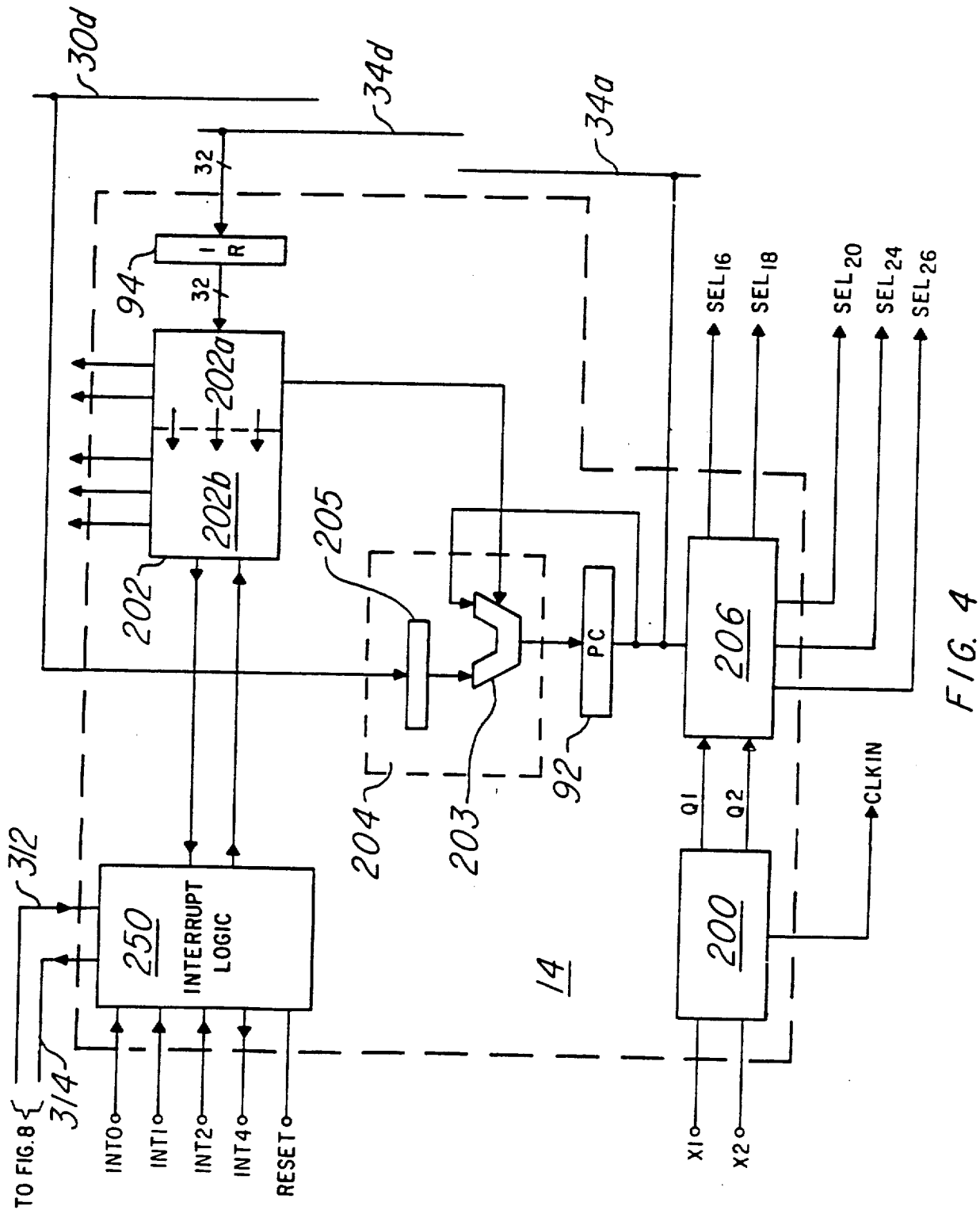

DATA PROCESSING DEVICE HAVING DIRECT MEMORY ACCESS WITH IMPROVED TRANSFER CONTROL

CROSS-REFERENCE TO RELATED APPLICATIONS

This application is a continuation-in-part of application Ser. No. 025,443, filed March 13, 1987.

NOTICE

© Copyright 1987 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

This application is related to applications Ser. No. 025,417, Ser. No. 025,756, and Ser. No. 025,413 all filed March 13, 1987, and also to application Ser. No. 035,338, filed April 6, 1987.

This invention relates to data processing devices, and specifically to the architecture of single-chip microcomputers in connection with direct memory access (DMA).

BACKGROUND OF THE INVENTION

A microprocessor device is a central processing unit or CPU for a digital processor which is usually contained in a single semiconductor integrated circuit or "chip" fabricated by MOS/LSI technology, as shown in U.S. Pat. No. 3,757,306 issued to Gary W. Boone and assigned to Texas Instruments. The Boone patent shows a single-chip 8-bit CPU including a parallel ALU, registers for data and addresses, an instruction register and a control decoder, all interconnected using the von Neumann architecture and employing a bidirectional parallel bus for data, address and instructions. U.S. Pat. No. 4,074,351, issued to Gary W. Boone, and Michael J. Cochran, assigned to Texas Instruments, shows a single-chip "microcomputer" type device which contains a 4-bit parallel ALU and its control circuitry, with on-chip ROM for program storage and on-chip RAM for data storage, constructed in the Harvard architecture. The term microprocessor usually refers to a device employing external memory for program and data storage, while the term microcomputer refers to a device with on-chip ROM and RAM for program and data storage. In describing the instant invention, the term "microcomputer" will be used to include both types of devices, and the term "microprocessor" will be primarily used to refer to microcomputers without on-chip ROM; since the terms are often used interchangeably in the art, however, it should be understood that the use of one or the other of these terms in this description should not be considered as restrictive as to the features of this invention.

Modern microcomputers can be grouped into two general classes, namely general-purpose microprocessors and special-purpose microcomputers/microprocessors. General purpose microprocessors, such as the M68020 manufactured by Motorola, Inc., are designed to be programmable by the user to perform any of a wide range of tasks, and are therefore often used as the central processing unit in equipment such as personal computers. Such general-purpose microprocessors, while having good performance for a wide range of arithmetic and logical functions, are of course not specifically designed for or adapted to any particular one of such functions. In contrast, special-purpose microcomputers are designed to provide performance improvement for specific predetermined arithmetic and logical functions for which the user intends to use the microcomputer. By knowing the primary function of the microcomputer, the designer can structure the microcomputer in such a manner that the performance of the specific function by the special-purpose microcomputer greatly exceeds the performance of the same function by the general-purpose microprocessor regardless of the program created by the user.

One such function which can be performed by a special-purpose microcomputer at a greatly improved rate is digital signal processing, specifically the computations required for the implementation of digital filters and for performing Fast Fourier Transforms. Because such computations consist to a large degree of repetitive operations such as integer multiply, multiple-bit shift, and multiply-and-add, a special-purpose microcomputer can be constructed specifically adapted to these repetitive functions. Such a special-purpose microcomputer is described in U.S. Pat. No. 4,577,282, assigned to Texas Instruments Inc. The specific design of a microcomputer for these computations has resulted in sufficient performance improvement over general purpose microprocessors to allow the use of such special-purpose microcomputers in real-time applications, such as speech and image processing.

Digital signal processing applications, because of their computation intensive nature, also are rather intensive in memory access operations. Accordingly, the overall performance of the microcomputer in performing a digital signal processing function is not only determined by the number of specific computations performed per unit time, but also by the speed at which the microcomputer can retrieve data from, and store data to, system memory. Prior special-purpose microcomputers, such as the one described in said U.S. Pat. No. 4,577,282, have utilized modified versions of a Harvard architecture, so that the access to data memory may be made independent from, and simultaneous with, the access of program memory. Such architecture has, of course, provided for additional performance improvement.

However, the use of a Harvard architecture instead of a von Neumann architecture also provides certain limitations, some of which may adversely impact the performance of the microcomputer in digital signal processing applications. For example, the data and program memory, since they are accessed by different buses, generally must reside in separate address spaces, if not in separate physical locations. Accordingly, a first dedicated memory must be provided for data memory and a second dedicated memory must be provided as program memory in the Harvard architecture. This limits the flexibility of the microcomputer, by preventing the use of unutilized data memory for program storage, and vice-versa.

Direct memory access (DMA) is another useful function for both general and special purpose microcomputers, and is an especially useful function in digital signal processing applications. As the performance of microcomputers has increased over time, the rate at which data and instructions must be provided from memory has also increased. On-chip DMA controllers have been used to relieve the central processing unit from controlling the provision of data and instructions to itself. However, control of the start and stop of a DMA transfer has been accomplished by way of a single signal, such as a bit in a DMA control register, which has provided for inflexible control of the DMA operation, as once the DMA transfer has begun, it may not be stopped prior to the completed transfer of the entire block except by a full abort of the transfer of the block. Such inflexibility in the control of the DMA operation may waste machine cycles in certain situations, as either the central processing unit must idle awaiting the completion of the DMA transfer of the entire block, or the DMA must be unconditionally aborted and subsequently restarted (wasting DMA cycles).

It would therefore be advantageous to be able to control DMA operation to be held at states within the operation, so as to allow the DMA operation to occur at the most efficient times, such as when not in conflict with the central processing unit. Such control would help reduce the amount of time that the central processing unit is not performing useful operations, increasing the overall performance of the microcomputer accordingly.

It is therefore an object of this invention to provide a microcomputer with an on-chip DMA controller which has the capability of holding the transfer at various states therein.

It is yet another object of the invention to provide such capability by using multiple bits in a control register to select the hold states.

It is yet another object of the invention to utilize system interrupts, rather than dedicated interrupt terminals, for the synchronization of the DMA operation with external memory devices.

Further objects and advantages of the instant invention will become apparent to those of ordinary skill in the art having reference to the following specification, together with its drawings.

SUMMARY OF THE INVENTION

The invention may be incorporated into a microcomputer which has an on-chip direct memory access (DMA) controller, for effecting DMA transfers without requiring intervention of the central processing unit. The DMA controller contains a control register, for receiving a code indicating the desired start/stop condition for the DMA transfer. This code is capable of unconditionally aborting the DMA transfer, for indicating that the DMA controller is to stop upon completion of the current read or write operation, and for indicating that the DMA controller is to stop upon completion of the next write operation. In addition, the code may cause the DMA controller to unconditionally restart the DMA operation from its present state, such as restarting it if stopped after a read operation, or within a block being transferred. The DMA controller places status codes in a control register, which can be read by the remainder of the microcomputer. The DMA controller may also be source and/or destination synchronized by enabling system interrupts to affect only the DMA operation.

BRIEF DESCRIPTION OF THE DRAWINGS

FIG. 4 is an electrical diagram, in block form, of the controller of the microcomputer of FIG. 1.

FIG. 4b is a diagram illustrating the interrupt enable registers for the central processing unit and the DMA controller of the microcomputer of FIG. 1.

DETAILED DESCRIPTION OF THE PREFERRED EMBODIMENT

Figure 1:
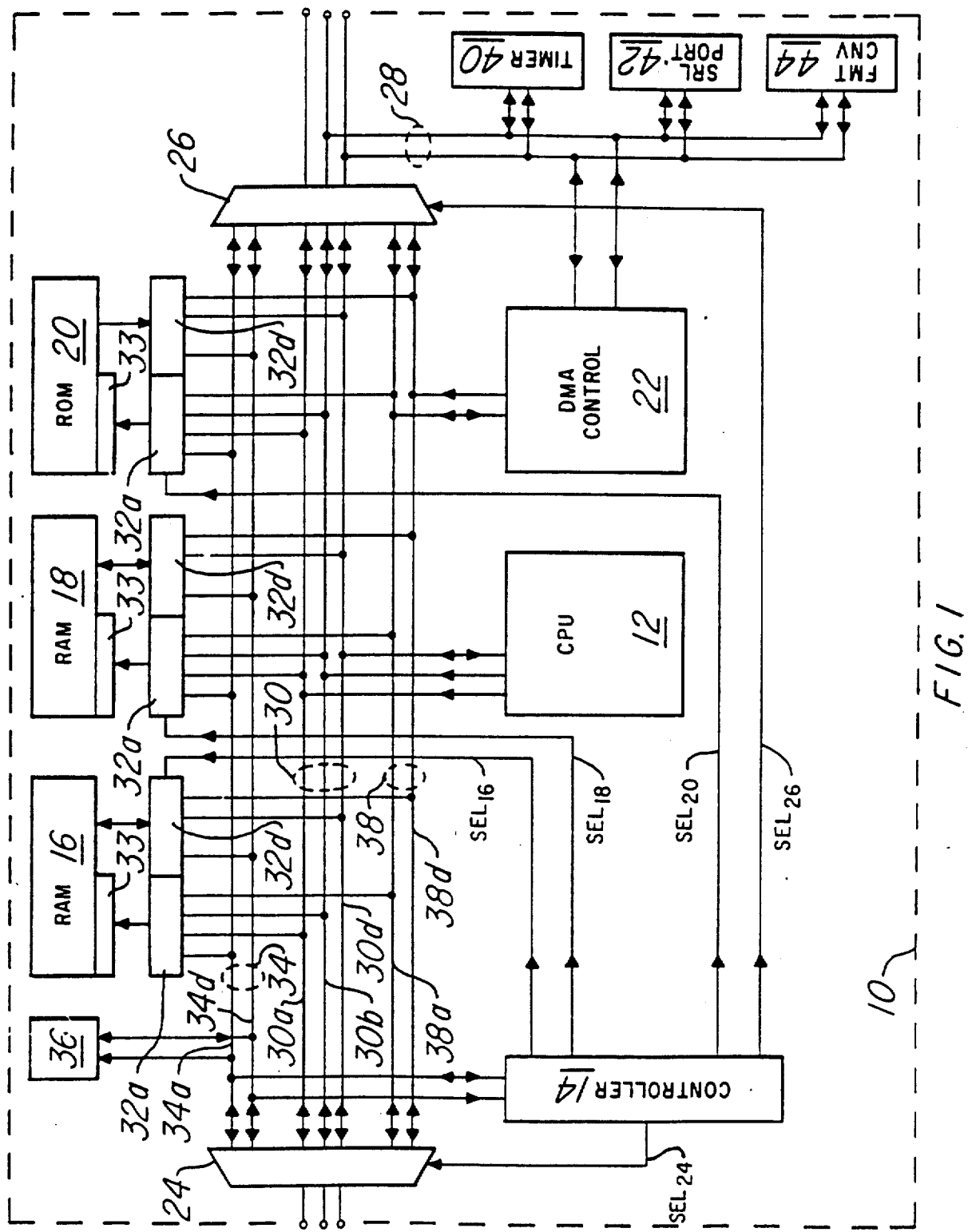
FIG. 1 is an electrical diagram, in block form, of a microcomputer constructed according to the invention.

Referring now to FIG. 1, the architecture of a microcomputer 10 is shown, said microcomputer being specially adapted to digital signal processing and incorporating the instant invention. The major functional blocks of microcomputer 10 are constituted by central processing unit (CPU) 12, controller 14, and direct memory access (DMA) controller 22. The memory contained in microcomputer 10 according to this embodiment of the invention includes random access memories (RAMs) 16 and 18, and read-only memory (ROM) 20. RAMs 16 and 18 contain, in this embodiment, $2^{10}$, or 1K, words; ROM 20 contains $2^{12}$, or 4K, words. External connection is made by way of interface ports 24 and 26, which multiplex various bus signals onto external terminals of microcomputer 10 and which provide special purpose signals for communication to external devices which are to receive and send data via such external terminals. Connected to interface port 26 is peripheral bus 28, which is adapted to be connected to various peripheral function blocks as will be explained hereinbelow.

Data communication within microcomputer 10 can be effected by way of data bus 30. Data bus 30 contains a set of data lines 30d which are dedicated to the communication of data signals among memories 16, 18 and 20, interface ports 24 and 26, and CPU 12. In this embodiment of the invention, data bus 30 contains thirty-two data lines in set 30d; accordingly, the data signals communicated among memories 16, 18 and 20, interface ports 24 and 26, and CPU 12 are considered as thirty-two bit words. Data bus 30 further contains a first set of address lines 30a and a second set of address lines 30b, both of which are for communication of address signals corresponding to memory locations in memories 16, 18 and 20. .In this embodiment of the invention, data bus 30 contains twenty-four address lines in each of sets 30a and 30b. Address lines 30a and 30b are also connected among CPU 12, interface ports 24 and 26, and memories 16, 18 and 20. As is evident from FIG. 1, memories 16, 18 and 20 each have two ports 32a and 32d. Each of ports 32a are connected to address lines 30a and 30b of data bus 30, and receive the address signals presented thereupon to provide access to the corresponding memory location by way of port 32d to data lines 30d of data bus 30.

Microcomputer 10 also effects communication by way of program bus 34. Similarly as data bus 30, program bus 34 contains a set of data lines 34d connected to ports 32d of memories 16, 18 and 20. Data lines 34d of program bus are also connected to interface ports 24 and 26, and to controller 14. Program bus 34 further contains a set of address lines 34a, which are connected to ports 32a of memories 16, 18 and 20, to interface ports 24 and 26, and to controller 14. Also connected to address bus 34 is instruction cache 36 which also has ports 32a and 32d connected to address lines 34a and data lines 34d, respectively. Instruction cache 36 is a small (64 word) high speed memory which is used to retain the most recently used instruction codes so that, if external memory devices are used for program storage, the retrieval of repetitively used instructions can be effected at the same rate as from memories 16, 18 and 20. Detailed construction and operation of instruction cache 36 is given hereinbelow. Controller 14 contains such circuitry as required to decode instruction codes received on data lines 34d of program bus 34 into control signals which control the specific logic circuitry contained in all blocks of microcomputer 10. FIG. 1 illustrates lines $SEL_{16}$, $SEL_{18}$, $SEL_{20}$, $SEL_{24}$ and $SEL_{26}$ which carry certain of these control signals to control access of microcomputer 10 to memories 16, 18, and 20, and peripheral ports 24 and 26, respectively; other such control signals generated by controller 14 are not shown in FIG. 1, for purposes of clarity. Because of its connection to instruction cache 36 and to controller 14, program bus 34 is used primarily for the addressing and communication of instruction codes contained in memories 16, 18 and 20. According to the invention, such instruction codes can reside in any of memories 16, 18 and 20, or in external memory, without designation of any specific locations as dedicated to program memory.

DMA controller 22 is connected to memories 16, 18 and 20 by way of DMA bus 38. Similarly as data bus 30 and program bus 34, DMA bus 38 has a set of data lines 38d which are connected to ports 28d of memories 16, 18 and 20. DMA bus 38 further has a set of address lines 38a connected to ports 28a of memories 16, 18 and 20. DMA controller 22 is also connected to peripheral bus 28, and to interface port 26 via peripheral bus 28. DMA controller 22 effects direct memory access operations, by which blocks of data stored within the memory space of microcomputer 10 may be moved from one area of memory (the source) to another (destination). The source area of memory may be within memories 16, 18 or 20, or in memory devices external to microcomputer 10 which are connected to the terminals served by interface port 24, and the destination of the block of data may be in all of such memories (except of course ROM 20). It is apparent from the construction of microcomputer 10 as shown in FIG. 1, and from the description given hereinbelow, that such DMA operations may be effected by DMA controller 22 in microcomputer 10 without requiring the intervention of CPU 12.

Ports 32a are primarily multiplexers, so that selection of one set of address lines 30a, 30b, 34a, or 38a for connection to its associated memory 16, 18 or 20 can be effected. Similarly, each of ports 32d are connected to data lines 30d of data bus 30, for communication of the data stored (or to be stored) by the addressed memory location. Memories 16, 18 and 20 each contain an address decoder 33, connected to its port 32a, for decoding the memory address signal presented on the selected one of said address lines 30a, 30b, 34a, or 38a in a manner well known in the art. Based on the output from address decoder 33, access is granted to the memory location specified by the selected address signal. RAMs 16 and 18, and ROM 20, are all constructed as are well known in the art, so that the selected memory location is sensed and/or written based upon the output of address decoder 33 therewithin. As is also well known in the art for such memories, ports 32d provide a high-impedance output to the data lines of buses 30, 34 and 38 connected thereto when not selected, thereby preventing data conflicts on buses 30, 34 and 38.

Each of the sets of address lines in data bus 30, program bus 34 and DMA bus 38 consist of twenty-four conductors in the preferred embodiment of this invention. Accordingly, the maximum number of memory locations addressable by way of the sets of address lines in data bus 30, program bus 34 and DMA bus 38 is $2^{24}$ words (sixteen Mwords) of thirty-two bits. However, since the total number of words in memories 16, 18 and 20 is 6K, a large amount of the addressable memory space of microcomputer 10 may reside in memory devices external to microcomputer 10. Such external memory will of course also have address decoding capability, similar to the on-chip memories 16, 18 and 20, and will respond to the generated address signals on the address lines of buses 30, 34 and 38 in a similar fashion. According to the instant invention, a single memory address space is provided for microcomputer 10, so that a given address signal presented on any given set of address lines of buses 30, 34 and 38 will address a memory location in only one of memories 16, 18 and 20. Therefore, using the example of address lines 30a being selected by ports 32a, a given address signal on address lines 30a will correspond to a memory location in only one of memories 16, 18 and 20, or in external data, program or input/output memory. It should be noted that microcomputer is organized in such a fashion that it is preferable that external data and program memory be accessed by way of peripheral port 24, and that external input/output memory be accessed by way of peripheral port 26.

Peripheral bus 28 is connected between interface port 26 and various peripheral functions. Peripheral bus is therefore selectively connectable to any one of buses 30, 34 and 38, depending upon the control of peripheral port 26 by controller 14. In this manner, peripheral bus 28 appears to the remainder of microcomputer 10 as an off-chip bus. This provides for such functions as normally provided by peripheral devices to be incorporated into microcomputer 10; communications with such peripheral devices will be enacted by the remainder of microcomputer 10 in much the same way as an off-chip device. By way of example, microcomputer 10 of FIG. 1 has timer 40, serial port 42, and format converter 44 attached to peripheral bus 28; as discussed above, DMA controller 22 is also connected to peripheral bus 28. Similarly as the other buses described above, peripheral bus 28 contains data lines 28d and address lines 28a. In contrast to the communication between memories 16, 18 and 20 and the remainder of microcomputer 10 connected to buses 30, 34 and 38, however, address lines 28a of peripheral bus 28 are used to select one of said peripherals 40, 42, or 44 connected thereto to receive or transmit data from or to data lines 28d of peripheral bus 28. In addition, as will be described below, control registers in DMA controller 22 are also accessed by way of peripheral bus 28.

Figure 2:
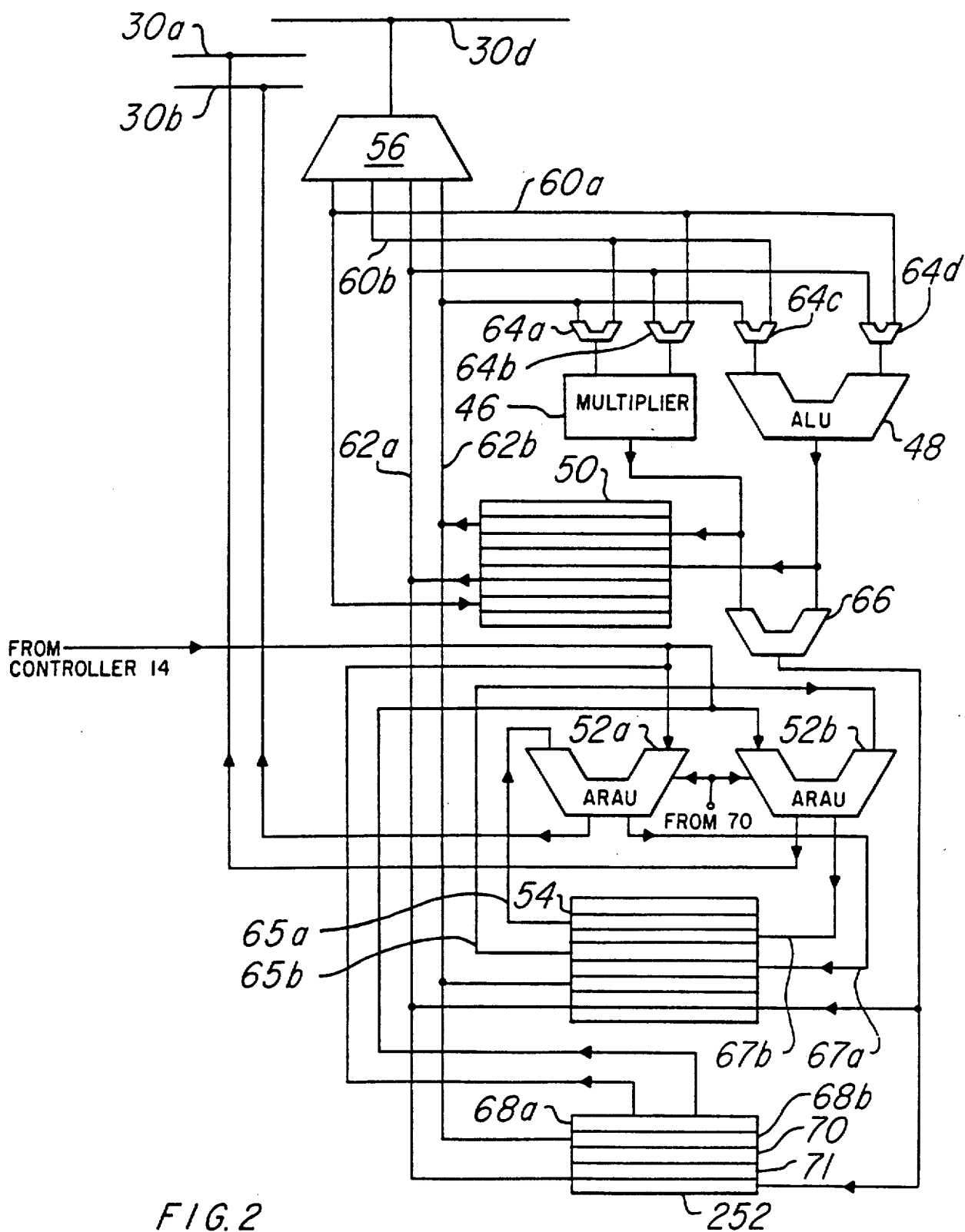
FIG. 2 is an electrical diagram, in block form, of the central processing unit of the microcomputer of FIG. 1.

Referring now to FIG. 2, the construction and operation of CPU 12 will be explained in detail. CPU 12 contains a dedicated multiplier 46, an arithmetic logic unit (ALU) 48, data registers 50a through 50h (collectively referred to as data registers 50), auxiliary arithmetic logic units (ARAUs) 52a and 52b, auxiliary data registers 54a through 54h (collectively referred to as data registers 54), data bus controller 56, and a bank of control registers (including, but not limited to, index registers 68a and 68b, block register 70 and status register 71) which will be further described below.

One of the inputs to multiplier 46 is operable to receive data from either CPU bus 60a or register bus 62a via multiplexer 64a, and the other of the inputs to multiplier 46 is operable to receive data from either CPU bus 60b or register bus 62b, via multiplexer 64b. Similarly, ALU 48 performs operations on its two inputs, one of which is operable to receive data from either CPU bus 60a or register bus 62a via multiplexer 64c, and the other of the inputs to multiplier 46 is operable to receive data from either CPU bus 60b or register bus 62b, via multiplexer 64d. Multiplexers 64a through 64d are controlled by controller 14, according to the instruction code to be executed by CPU 12.

Multiplier 46 is a floating-point multiplier as is well known in the art, in effect containing both a hardware multiplier (for multiplication of the mantissas) and an arithmetic logic unit (for addition of the exponents). Multiplier 46 in the preferred embodiment of the invention is of the size which can perform an integer multiplication to produce a thirty-two bit resulte, and which alternatively can perform a floating-point multiplication to produce a forty-bit result, considering thirty-two of the bits as the mantissa of the floating-point operands, and the other eight bits as the exponent of the floating-point operands. ALU 48 is an arithmetic logic unit constructed according to any one of a number of well known configurations which can perform integer and floating-point addition and subtraction on up to two forty bit binary numbers. As will be described in further detail hereinbelow, the parallel combination of multiplier 46 and ALU 48 allows CPU 12 to perform operations using both functions simultaneously, which provides for rapid calculation of such operations as multiply-and-accumulate instructions. The outputs of multiplier 46 and ALU 48 are each connected to data registers 50, so that the results of the operations executed by each of multiplier 46 and ALU 48 can be stored in selected ones of said data registers 50.

Data registers 50 are forty-bit registers, used to store data in integer or floating-point format, depending upon the user's application. When storing information in floating-point format, the eight most significant bits are considered as the exponent, and the thirty-two least significant bits are considered as the mantissa. The primary function of data registers 50 is an accumulator function, so that the plurality of data registers 50 in effect provides CPU 12 with multiple accumulators. Data registers 50 are also connected to register buses 62a and 62b, which can provide output to data bus 30 via data bus controller 56, and be provided as inputs again to multiplier 46 and ALU 48. Accordingly, a multiply and accumulate instruction can be easily and efficiently implemented by CPU 12. For example, the result of a multiplication by multiplier 46 can be input to ALU 48 via one of data registers 50 and register bus 62a, for addition to a prior result stored in another one of data registers 50 and applied to ALU 48 via register bus 62b. The outputs of multiplier 46 and ALU 48 are also connected to the inputs of multiplexer 66, which is also controlled by controller 14. The output of multiplexer 66 is connected to auxiliary registers 54, so that the results of the operation of either multiplier 46 or ALU 48 can be stored in a selected one of auxiliary registers 54, or in the bank of control registers including index registers 68a and 68b, block register 70 and status register 71.

Auxiliary registers 54 are thirty-two bit registers used in conjunction with ARAUs 52 to generate addresses for application to address lines 30a and 30b of data bus 30, and for computation of subsequently used addresses stored in auxiliary registers 54. Auxiliary registers 54 are connected to one input of each of ARAUs 52a and 52b by way of auxiliary register buses 65a and 65b, respectively. Each of ARAUs 52a and 52b also have an input connected to controller 14, an input connected to index registers 68a and 68b, and an input connected to block register 70, all for receiving address modification signals depending upon the address mode specified by the instruction code being executed. ARAUs 52a and 52b have an output connected to address lines 30a and 30b of data bus 30, respectively, upon which ARAUs 52a and 52b present a memory address signal. In addition, ARAUs 52a and 52b have an output connected to buses 67a and 67b, respectively, for storing in selected ones of auxiliary registers 54 the results of modifications generated in the process of memory addressing, as will be explained below. As is evident by reference to FIG. 1, and as well known in the art, instruction codes executable by microcomputer 10 addresses memories 16, 18 and 20, as well as external memory via peripheral ports 24 and 26, in a plurality of ways; examples of such addressing include addressing of an individual register 50 and 54 in CPU 12 and direct addressing of a location in memories 16, 18 and 20, and the well-known immediate and relative addressing modes.

Indirect memory addressing is facilitated by ARAUs 52a and 52, in conjunction with auxiliary registers 54. As is well known, indirect addressing in microcomputers is a mode of memory addressing where the address of the memory location is contained in the specified location. An example of indirect memory addressing is an instruction to the microcomputer to "address the memory location specified by the contents of register 50a." Indirect addressing allows registers 54 to be used as dynamic memory address pointers, which allow the computation of a memory location by CPU 12 (and its storage in one of registers 54) without the necessity of changing the contents of a program memory location. In addition, ARAUs 52a and 52b are operable to utilize a displacement code generated from the instruction code, which modifies the computation of the indirect address by ARAUs 52a and 52b. The displacement code is an eight-bit code generated by controller 14 in its decoding of the instruction code, and is input to one of the inputs of each of ARAUs 52a and 52b. CPU 12 interprets the absence of a displacement signal as an implied value of one, which is useful to automatically increment or decrement the contents of the register 54 used in a repetitive operation. As such, ARAUs 52a and 52b are primarily used in the addressing of data locations in RAMs 16 and 18, and in external RAM used as data memory; as shown in FIG. 1, addresses generated by ARAUs 52a and 52b on address lines 30a and 30b of data bus 30 can of course also access ROM 20. ARAUs 52a and 52b are thus operable to perform the necessary integer addition or subtraction operation upon the contents of the one of registers 54 connected to one of its inputs and upon the displacement code generated by controller 14. Table 1 lists a number of the types of indirect addressing modes supported in part by ARAUs 52a and 52b in conjunction with registers 54 and controller 14. It should be noted that the instruction codes stored in the program memory portions/locations of memories 16, 18 and 20 (or externally) contain a five-bit code which specifies the memory addressing mode desired, including those listed in Table 1 In Table 1, "add" specifies the memory location to be addressed, "ARn" specifies the contents of one of registers 54, and "disp" the value of the displacement code generated by controller 14. The updated value of the contents of one of auxiliary registers 54 is denoted by "ARn'" in Table 1.

TABLE 1

| Description | Operation |
| --- | --- |
| Indirect w/pre-displacement add | add = ARn + disp |
| Indirect w/pre-displacement subtract | add = ARn − disp |
| Indirect w/pre-displacement add/modify | add = ARn + disp |
| | ARn' = ARn + disp |
| Indirect w/pre-displacement subtract/modify | add = ARn − disp |
| | ARn' = ARn − disp |
| Indirect w/post-displacement add/modify | add = ARn |
| | ARn' = ARn + disp |
| Indirect w/post-displacement subtract/modify | add = ARn |
| | ARn' = ARn − disp |

CPU 12 contains index registers 68a and 68b, also connected to the output of multiplexer 66, connected to register buses 62a and 62b, and are also directly connected to the inputs of ARAUs 52a and 52b which receive the displacement codes from controller 14. Controller 14 of course will control the application of index register 68a, index register 68b, or the displacement code to this other input of ARAUs 52a and 52b. Index registers 68a and 68b can be loaded by ALU 48 for storing an index value to be utilized in the indexed indirect addressing of memories 16, 18 and 20 (as well as external memory), by way of ARAUs 52a and 52b. Table 2 contains the indexed indirect addressing modes which, responsive to corresponding instruction codes received and decoded by controller 14, are executable by ARAUs 52a and 52b. Similarly as the addressing modes listed in Table 1, these individual addressing modes are enabled by unique ones of five-bit codes in the instruction code. The term "IRm" in Table 2 indicates the contents of one of index registers 68a and 68b.

TABLE 2

| Description | Operation |
| --- | --- |
| Indirect w/pre-index add | add = ARn + IRm |
| Indirect w/pre-index subtract | add = ARn − IRm |
| Indirect w/pre-index add/modify | add = ARn + IRm |
| | ARn' = ARn + IRm |
| Indirect w/pre-index subtract/modify | add = ARn − IRm |
| | ARn' = ARn − IRm |
| Indirect w/post-index add/modify | add = Arn |
| | ARn' = ARn + IRm |
| Indirect w/post-index subtract/modify | add = ARn |
| | ARn' = ARn − IRm |

Figure 2A:
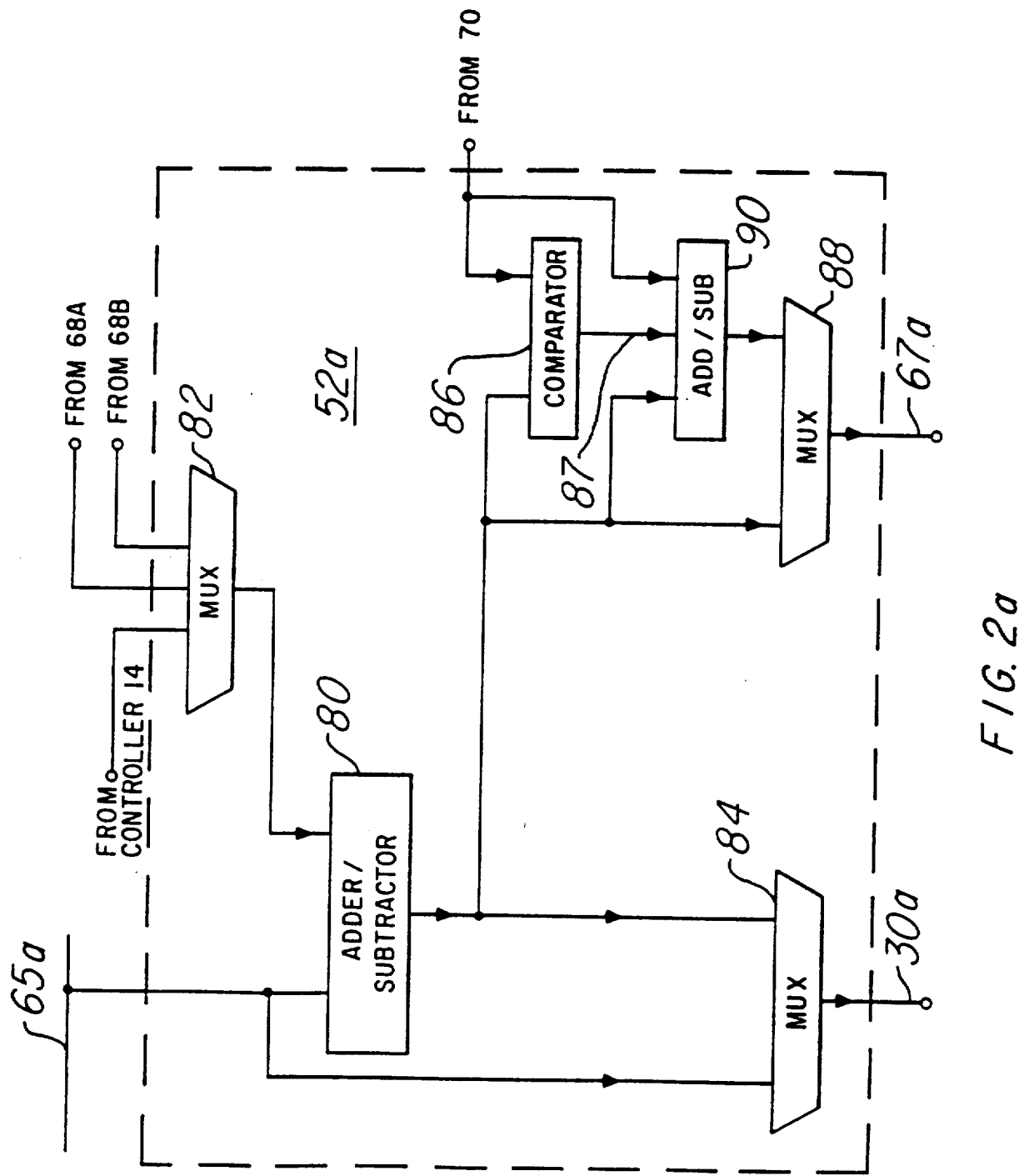
FIG. 2a is an electrical diagram, in block form, of an auxiliary arithmetic logic unit incorporated in the central processing unit of FIG. 2.

Referring now to FIG. 2a, the construction of ARAU 52a is illustrated in detail; it is of course understood that ARAU 52b is similarly constructed. As shown in FIG. 2, ARAU 52a receives at one input auxiliary register bus 65a, which is connected to one input of adder/subtractor 80. Multiplexer 82 receives three input signals; one of these input signals is the displacement code generated by controller 14, and the other two input signals are the contents of index registers 68a and 68b. Multiplexer 82 is controlled by controller 14, responsive to the instruction code being executed, to select one of these three inputs for application to the second input of adder/subtractor 80.

Adder/subtractor 80 is a multiple-stage arithmetic logic unit as is well known in the art, which is capable of performing either a full-carry add or subtract. Controller 14 controls whether or not adder/subtractor 80 performs the add or subtract operation, responsive to decoding of the instruction code containing the address mode information. Adder/subtractor 80 further contains capability for propagating the carry information from stage to stage therewithin either in a forward or in a reverse direction. Such an adder/subtractor is described in copending U.S. patent application 935,465; said application further describes the benefits of reverse-carry propagation in performing Fast Fourier Transform algorithms. Controller 14 similarly controls the direction of carry propagation in adder/subtractor 80, responsive to the instruction code being executed.

The output of adder/subtractor 80 is connected to one input of multiplexer 84, and is also connected to one input of comparator 86. The other input of multiplexer 84 is connected directly to auxiliary register bus 65a, and the output of multiplexer 84 is connected to address lines 30a of data bus 30. Multiplexer 84 is controlled by controller 14 responsive to the current instruction code, for application of the proper value of the computed address to address lines 30a of data bus 30. The output of adder-subtractor 80 is also connected to a first input of multiplexer 88, which has its output connected to bus 67a which communicates data from ARAU 52a to a selected one of auxiliary registers 54, for updating of the auxiliary register 54 contents as desired. A second input of multiplexer 88 is connected to adder/subtractor 90. Comparator 86 and adder/subtractor 90 comprise circular addressing logic which will be explained hereinbelow; for purposes of the following discussion, its operation will be ignored.

By reference to FIG. 2a, the operation of ARAU 52a in accomplishing the various indirect addressing modes listed in Tables 1 and 2 becomes apparent. Controller 14, responsive to the instruction code being executed, controls multiplexer 82 to select the desired one of index registers 68a or 68b ("IRm" in Table 2) or the displacement code generated by controller 14, for application to the contents of the selected one of auxiliary registers 54 by adder/subtractor 80. As described above, controller 14 will also control whether or not adder/subtractor 80 performs an addition or subtraction operation, and also whether adder/subtractor 80 will calculate its output using the forward or reverse carry propagation. In the event that the desired address mode is a post-index or post-displacement add or subtract, controller 14 will cause multiplexer 84 to select auxiliary register bus 65a to be connected to address lines 30a of data bus 30 (corresponding to the operation "add=ARn" in Tables 1 and 2). Conversely, if the desired indirect address mode is a pre-index or pre-displacement indirect address, controller 14 will cause multiplexer 84 to select the output of adder/subtractor 80 for application to address lines 30a of data bus 30 (corresponding to the operation "add=ARn+/−IRm/disp" in Tables 1 and 2).

ARAU 52a also determines the updating of auxiliary registers 54 according to the indirect addressing modes selected. Assuming that the circular indirect addressing mode is not selected (such circular addressing will be discussed hereinbelow), controller 14 will select whether or not the contents of the selected one of auxiliary registers 54 are to be modified or not. In the event the desired indirect addressing mode does not modify the contents of the auxiliary register 54, controller 14 will disable (tri-state) the output of multiplexer 88, so that so that the contents of the selected one of auxiliary registers 54 will not be updated. If the contents of the selected one of auxiliary registers 54 are to be modified with the result of the addition or subtraction by adder/subtractor 80, controller 14 will cause multiplexer 88 to select the output of adder/subtractor 80 for application to bus 67a (corresponding to the operation "ARn-'=ARn+/−IRm/disp" in Tables 1 and 2).

It is of course apparent from the construction of CPU 12 shown in FIG. 2 that the operation of the various functions can occur in parallel. For example, ARAU 52a can be operating in parallel with ARAU 52b, since the inputs thereto are separately connected to registers 54, and to controller 14 (and index registers 68a and 68b). In addition, the output of ARAU 52a is connected to address lines 30a of data bus 30 and to bus 67a, while the output of ARAU 52b is connected to address lines 30b of data bus 30 and to bus 67b. In this manner, the operation of ARAUs 52a and 52b can occur simultaneously, without interference by or to one another. In addition, once the prior state of register buses 62a and 62b have been received by multiplier 46 and ALU 48 as desired, the operation of multiplier 46 and ALU 48 can occur simultaneously not only with each other, but also with ARAUs 52a and 52b. In this way, especially for algorithms using repetitive operations such as multiply-and-accumulate, CPU 12 is able to achieve substantial performance improvements from such parallel operation.

Block register 70 is connected to the output of multiplexer 66, and is connected to register buses 62a and 62b, as well as being directly connected to ARAUs 52a and 52b. Block register 70 provides a "circular" feature in the indirect addressing scheme, so that a block of data memory locations can be repetitively accessed in a looped fashion. As is well known in the art, certain computations required for digital signal processing applications can be expressed in repetitive operations on a block of stored data. For example, the computation of finite impulse response (FIR) digital filter functions, requires the repetition of multiply-and-accumulate operations on a block of data, where the results of the multiply-and-accumulate are stored in the memory location from which one of the operands was fetched.

Referring back to FIG. 2, data bus controller 56 is connected to data lines 30d of data bus 30, and serves to control the flow of data from data bus 30 to the various portions of CPU 12. Internal to CPU 12 are a pair of CPU buses 60a and 60b, and a pair of register buses 62a and 62b. Data bus controller 56 consists of a four-to-one multiplexer, having its four inputs connected to CPU buses 60a and 60b, and to register buses 62a and 62b. Communication from CPU 12 to data lines 30d of data bus 30 thus can occur from any one of these four internal buses at any given time; such communication of course requires that a corresponding address signal be generated on address lines 30a or address lines 30b in conjunction with the data communication on data lines 30d. Since the outputs of ARAUs 52a are connected to address lines 30a and 30b of data bus 30, respectively, such addresses can be generated by CPU 12 in conjunction with the desired data communication through data bus controller 56.

The parallel nature of ARAUs 52a and 52b allows the computation of more than one memory address by CPU 12 within a single machine cycle. Accordingly, data bus controller 56 is capable of connecting more than one of CPU buses 60 and register buses 62 to data lines 30d of data bus 30 within a single machine cycle. Control of the application of the output of ARAUs 52a and 52b to the address lines 30a and 30b of data bus 30, and of the time-multiplexing of data lines 30d to the internal buses of CPU 12, is done by controller 14 according to the instruction code being executed.

Figure 3:
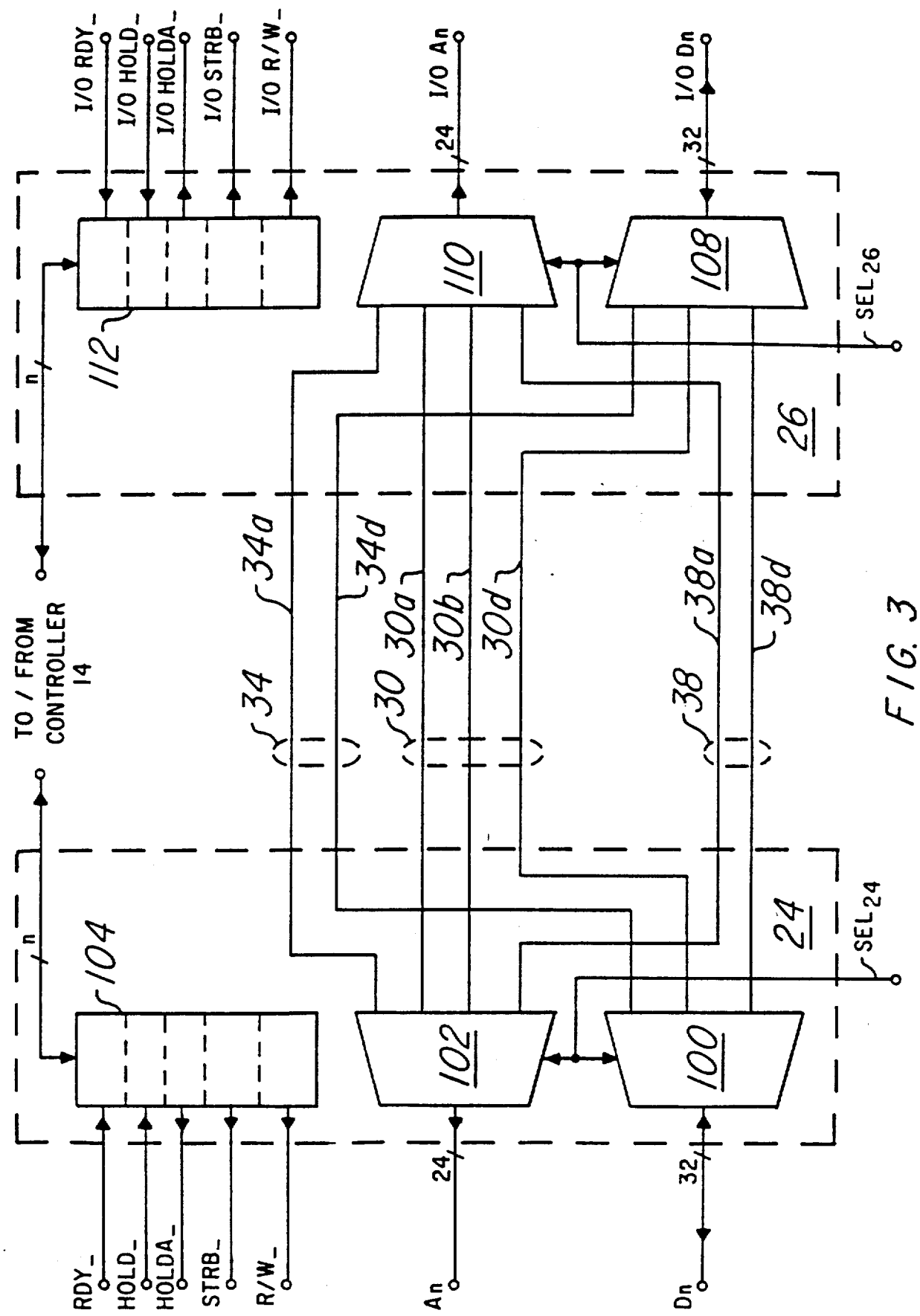
FIG. 3. is an electrical diagram, in block form, of the peripheral ports of the microcomputer of FIG. 1.

Referring now to FIG. 3, the construction of peripheral ports 24 and 26 will be described in detail. Peripheral ports 24 and 26 are connected to data bus 30, program bus 34 and DMA bus 38, as was described earlier with reference to FIG. 1. Peripheral port 24 consists primarily of a multiplexer 100, which selectively connects external data lines $D_n$ to data lines 30d of data bus 30, data lines 34d of program bus 34 or data lines 38d of DMA bus 38, responsive to control signals generated on lines $SEL_{24}$ by controller 14. It should be noted that multiplexer 100 creates a bidirectional connection between external data lines $D_n$ and the data lines 30d, 34d or 38d, so that data may be received or presented therebetween. In addition, multiplexer 102 selectively connects external address lines $A_n$ to address lines 30a or 30b of data bus 30, address lines 34a of program bus 34, or address lines 38a of DMA bus 38, also responsive to controller 14 depending upon which data lines are connected by multiplexer 100 to data lines $D_n$.

A number of control lines are driven by buffers 104 in peripheral port 24, also responsive to signals generated by controller 14 (on lines which are not shown, for purposes of clarity). These control lines output by peripheral port 24 include line R/W__, which specifies the direction of the flow of data through peripheral port 24. For example, an external memory device could serve as data memory, by having its data input and output terminals connected to lines $D_n$ and its address terminals connected to lines $A_n$. Peripheral port 24 of microcomputer 10 could effect a memory read of such external memory by connecting the desired address lines, e.g., address lines 30b of data bus 30, to lines An and by driving line R/W__ to a high logic state, indicating that the external memory device is to be read at the location specified on address lines 30b of data bus 30. Conversely, a high logic state on line R/W__ would indicate that the external memory device is to be written with the data state present on data lines 30d, connected via multiplexer 100 to lines $D_n$.

The control lines connected to peripheral port 24 further include line STRB__ (as in line R/W__, the "__" designation indicating active low) driven by buffers 104 responsive to controller 14, which is a clock signal indicating to external memory that the set of address lines 30a, 30b, 34a or 38a connected to lines $A_n$, as the case may be, are presenting a valid address signal to address memory. Lines HOLD__ and RDY__ are inputs to microcomputer 10 from external devices. Line HOLD__ being active low causes peripheral port 24 to place its interface to lines $D_n$, $A_n$, R/W__, and STRB__ in a high-impedance state, so that a plurality of devices connected to such lines may communicate among one another without interference from, or interference to, microcomputer 10. Line HOLDA__ is an acknowledge signal driven by controller 14 via buffers 104 in peripheral port 24, and is has a low logic state which indicates that microcomputer 10 has received the HOLD__ signal in its low state, and has placed peripheral port 24 in a high impedance state. Line RDY__ is an input to microcomputer 10 and, when driven to its low logic state, indicates that an external device connected to data lines $D_n$, address lines An, and control lines R/W__ and STRB__ has completed a communication cycle with microcomputer 10. Controller 14 requires the RDY__ signal prior to causing peripheral port 24 to drive said lines to valid states other than that directed to the communication cycle which had ended with the RDY__ signal low.

Peripheral port 26 is similarly constructed as peripheral port 24, but is controlled by lines $SEL_{26}$ independently from peripheral port 24, so that communication at both peripheral ports 24 and 26 can occur simultaneously and independently, so long as the buses 30, 34 and 38 used by the two ports are not simultaneously used. Peripheral port 26 is primarily useful in communication with external input and output devices. Accordingly, as shown in FIG. 3, peripheral port 26 contains multiplexers 108 and 110, and buffers 112, corresponding to like components in peripheral port 24. Similarly, peripheral port 26 interfaces data bus 30, program bus 34 and DMA bus 38 to lines $I/OD_n$, $I/OA_n$, $I/ORDY$__, $I/OSTRB$__, $I/OHOLD$__, $I/OHOLDA$__ and $I/OR/W$__, having the same functions as similarly designated lines at peripheral port 24. It should be noted that, because of the plurality of buses 30, 34, and 38 connected to peripheral ports 24 and 26, peripheral port 24 and peripheral port 26 can be operating simultaneously.

Referring now to FIG. 4, the construction and operation of controller 14 will be described in detail. Controller 14 serves the purposes of controlling the operation of the rest of microcomputer 10, so that the desired operation specified by the instruction codes will be properly executed.

Controller 14 receives clock signals presented from external to microcomputer 10. Clock generator 200 in controller 14 is connected to terminals X1 and X2 and generates the internal clock signals which are used in microcomputer 10, for example the system clock on line CLKIN. If a crystal is connected between terminals X1 and X2, clock generator 200 will, by way of an internal oscillator, generate the system clock signal on line CLKIN. Alternatively, an externally-generated clock can be applied to terminal X2, in which case the externally-generated clock signal will generate (possibly via a divide-by-n in clock generator 200, not shown) the system clock signal on line CLKIN. Clock generator 200 further generates clock signals Q1 and Q2, which occur on the first and third quarter-cycles of the period of the clock signal on line CLKIN, however generated; clock signals Q1 and Q2 are used by memory access arbitration logic 206 in controller 14, as described below.

Relative to the fetching of instruction codes and the control of microcomputer 10 responsive to such instruction codes, controller 14 contains program counter 92, instruction register 94, control logic 202, and program counter control logic 204. Program counter 92 is a twenty-four bit register, having an output connected to address lines 34a of program bus 34. The function of program counter 92 is to store the memory address of the next instruction to be fetched, decoded, and executed by microcomputer 10. In an instruction fetch cycle (which occurs during one period of the system clock signal on line CLKIN), the contents of program counter 92 are placed upon address lines 34a of program bus 34 and the one of memories 16, 18 or 20 (or external memory) containing the memory location corresponding to the address signal will present the addressed contents onto data lines 34d of program bus 34; the contents of the memory location having the address contained in program counter 92 constitute the instruction code of the next instruction to be decoded. Instruction register 94 is a thirty-two bit register which is connected to data lines 34d of program bus 34, and which receives the contents of the contents of program counter 92 during the fetch cycle.

During the decode cycle, occurring in the next period of the system clock signal on line CLKIN after the fetch cycle, the contents of instruction register 94 are decoded by control logic 202, to generate control signals going from controller 14 to the functional circuits of microcomputer 10. To accomplish this, a first portion of control logic 202 contains combinatorial logic for decoding the instruction code. Such combinatorial logic (shown as logic 202a in FIG. 4) can be realized in different well-known ways, such as a programmable logic array or a read-only memory. The thirty-two bit instruction code from instruction register 94 is thus decoded by combinatorial logic 202a into multiple output lines. Some of these lines are directly connected to functions outside of control logic 202, such as to program counter control logic 204; other of these lines are input into sequential logic 202b within control logic 202. Sequential logic 202b is operative to control the various functions of microcomputer 10 so as to allow the reading of data operands from memory by CPU 12, and so as to control the execution of the data processing operations on said operands by CPU 12. Sequential logic 202b accomplishes this, of course, by way of additional output lines emanating therefrom. The logic states of the output lines from control logic 202, whether from combinatorial logic 202a or sequential logic 202b, are thus determined by the instruction code received by control logic 202 from instruction register 94. It should be noted that the drawing figures referred to herein do not show the connection of these control lines between controller 14 and such functional circuitry for purposes of clarity.

It is therefore apparent that combinatorial logic 202a in control logic 202 can be decoding an instruction code which was stored in instruction register 94 while controller 14 is causing the fetch of the following instruction from memory. In addition, as is well known in the art, sequential logic 202b is operative to control the operand read for a given instruction simultaneously with the control of the execution of a previously fetched instruction. Accordingly, control logic 202 can be controlling microcomputer 10 in such a manner that portions of four different instruction codes may be carried out simultaneously. Such "pipelining" of the instruction codes will obviously reduce the time required to perform a given sequence of instructions.

Figure 4A:
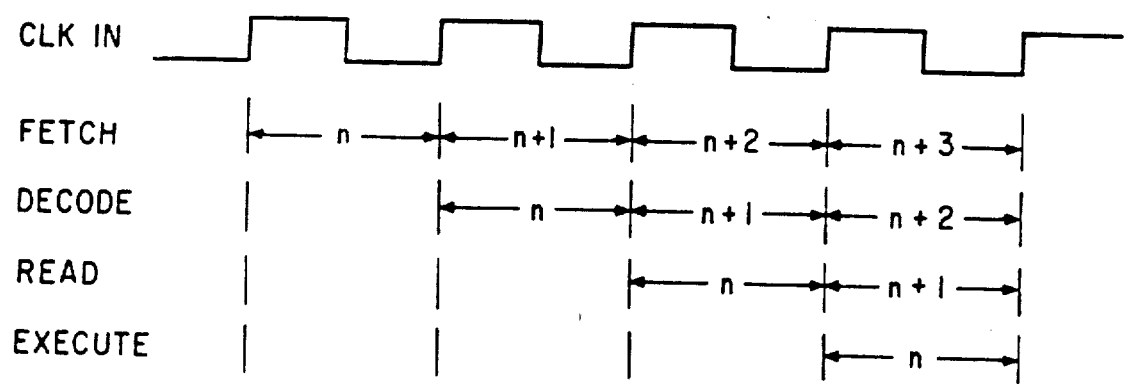
FIG. 4a is a timing diagram illustrating the pipeline feature performed by the controller illustrated in FIG. 4.

FIG. 4a illustrates an example of how the pipeline is filled, and accordingly how the pipeline operates for a typical instruction. In the first cycle of the system clock signal on line CLKIN, instruction n is being fetched by controller 14, for example from one of memories 16, 18 or 20. During the fetch cycle, however, program counter control logic 204 has incremented the contents of program counter 92 to contain the memory location of the instruction code for instruction n+1. During the second cycle of the system clock signal on line CLKIN, the instruction code for instruction n is being decoded by control logic 202. Also during this second cycle, the contents of program counter 92 are presented to address lines 34a of program bus 34, and the instruction code for instruction n+1 are fetched from program memory and loaded into instruction register 94.

During the third system clock cycle shown in FIG. 4a, sequential logic 202b is effecting a read from memory (e.g., RAM 16) of a data operand necessary for instruction n via data bus 30. In addition, since the instruction code for instruction n+1 has been fetched, the third cycle shown in FIG. 4a illustrates that instruction n+1 is being decoded by combinatorial logic 202a of control logic 202. Simultaneously with the read cycle for instruction n, however, the fetch of the instruction code for instruction n+2 is being done, assuming there is no bus or memory conflict with the read cycle for instruction n. As described above, generally the data operand is read by CPU 12 via data bus 30 while the instruction code is read via program bus 34; assuming that both reside in different memories 16, 18 or 20, or one residing in external memory, no bus conflict will occur.

During the fourth cycle of the system clock, instruction n will be executed under the control of sequential logic 202b in control logic 202, the read operation for instruction n+1 will be effected by sequential logic 202b, the instruction code for instruction n+2 will be decoded, and the instruction code for instruction n+3 will be fetched. Accordingly, the pipeline for microcomputer 10 will be filled, and the performance of a sequence of instructions will be optimal, subject to bus conflicts and to memory access conflicts which may, for certain instruction combinations, cause a wait cycle for one of the operations.

Data lines 30d of data bus 30 are received by controller 14, for control of the program flow in other than incremental fashion, such as a branch instruction, requiring that program counter 92 be loaded by CPU 12 or from memory. For example, in the event of an unconditional branch, the value of an operand contained in the instruction code, read from memory, or read from a register in CPU 12 may contain the address of the memory location containing the next instruction code to be executed. Program counter control logic 204 will then receive the value presented upon data lines 30d, and load program counter 92 accordingly, so that program control can pass to the desired location.

As illustrated in FIG. 4, program counter control logic 204 contains an adder 203 which receives the contents of program counter 92. Control logic 202 (preferably combinatorial logic 202a therein), controls adder 203 so that generation of the contents of program counter 92 for the next cycle may be performed in a variety of manners. As explained above, adder 203 may merely increment the prior contents of program counter 92, to step through the instruction sequence. However, program counter control logic 204 further contains an register 205, which can receive a value from data lines 30d of data bus 30. Program counter control logic 204 can thus calculate the contents of program counter 92 in various ways. For example, branching to a relative address (relative to program counter 92) may occur by way of loading register 205 with a value presented on data lines 30d of data bus 30; this value could then be added to the prior contents of program counter 92 to generate a new value for program counter 92. In addition, an absolute branch may be effected by loading register 205 with the desired memory address from data lines 30d of data bus 30, and by control logic 202 causing adder 203 to perform a "zero-add" with the contents of register 205 for application to program counter.

It should be further noted that microcomputer 10 is capable of performing a "delayed" branch instruction, so that the branch instruction is fetched three instructions before it is actually to occur. The delayed branch instruction, when executed, loads register 205 with the destination memory address of the branch as in a direct branch. However, control logic 202 will continue to increment the contents of program counter 92 for the next three instructions following the execution of delayed branch instruction. Upon the third instruction, adder 203 will apply the contents of register 205 to program counter 92, thereby effecting the branch while continuing to take advantage of the pipeline scheme. The pipeline may, of course, remain full after the branch, as the destination location may continue to be incremented as before by adder 203.

Controller 14 further includes interrupt logic 250, which is connected to a plurality of external terminals of microcomputer 10, to controller 14, and to various of the functions within microcomputer 10. Interrupt logic 250 serves the purpose of receiving interrupt signals presented to microcomputer 10 on the RESET terminal and on terminals INT0 through INT3, and receiving interrupt signals generated internally to microcomputer 10 from various functions such as serial port 42 and DMA controller 22. An example of such an internal interrupt signal is shown in FIG. 4 by line 312, which is an interrupt signal from DMA controller 22. Contained within CPU 12 as a control register are CPU interrupt enable register 252 and DMA interrupt enable register 253, each of which is a memory-mapped addressable register, and the contents of which specify whether each of the interrupt signals is enabled or disabled. Responsive to the receipt of a CPU-directed interrupt signal which is enabled by the contents of interrupt enable register 252, either from terminals INT0 through INT3 or from internal to microcomputer 10, and if controller 14 indicates that an access to an input/output memory location is not current, interrupt logic 250 will cause program counter 92 to be loaded with a memory address corresponding to the particular interrupt signal (the "interrupt vector"), and the execution of the program will continue from the interrupt vector location forward. Responsive to an instruction code generally included in the interrupt handling routine called by the interrupt vector, interrupt logic 250 will generate interrupt acknowledge signals on line INTA for external interrupts and, for example, on line 314 for the internal interrupt signal for DMA controller 22. As is well known in the art for such an operation, controller 14 will cause the prior contents of program counter 92 to be stored in a predetermined memory location (generally called a "stack"), so that the location of the instruction code which would have been fetched next will be reloaded after the interrupt has been serviced.

As will be explained in greater detail below, DMA controller 22 utilizes the same system interrupts as CPU 12 in the synchronization of DMA operations, so that microcomputer 10 does not require dedicated external terminals for DMA synchronization. Accordingly, DMA interrupt enable register 253 contains data similar in function to that of CPU interrupt enable register 252. It should be noted that in the handling of system interrupts, priority must necessarily be assigned between the CPU and DMA system interrupts, in order to avoid ambiguity in the effect of such interrupts. Since the DMA operations are intended to be transparent to the operation of CPU 12, it is therefore preferable to provide that an interrupt which is enabled both by CPU interrupt enable register 252 and by DMA interrupt enable register 253 will be treated as an interrupt to CPU 12 only.

Referring now to FIG. 4b, interrupt enable registers 252 and 253 are illustrated. As described above, each of interrupt enable registers 252 and 253 are within the memory address space of microcomputer 10, and therefore may be written to and read from as desired. Of course, the contents of CPU interrupt enable register 252 is written to independently from the writing of the contents of DMA interrupt enable register 253, and vice versa, to provide independent interrupt capability for CPU 12 and DMA controller 22. As the contents of each of interrupt enable registers 252 and 253 are identical, the description below applies to each.

Each of the input lines INT0 through INT2 and RESET received by interrupt logic 250 within controller 14 have an enable bit associated therewith in interrupt enable registers 252 and 253. so that externally asserted interrupts on each of the lines may be individually enabled and disabled. In addition, internally asserted interrupts from peripherals connected to peripheral bus 38 are also individually enabled by interrupt enable registers 252 and 253. These interrupts are associated with bits X0 and X1, enabling interrupts from serial port 42 indicating that the transmit registers for the first and second serial port channels therein, respectively, are empty; bits R0 and R1 also enable interrupts for serial port 42 which indicate that the receive registers for the first and second channels therein, respectively, are full. Bit TINT in interrupt enable registers 252 and 253 enables an interrupt which is assertable by timer 40 connected to peripheral bus 38. Bit DINT in interrupt enable registers 252 and 253 enables the interrupt provided by DMA controller 22 itself. It should be noted, of course, that additional interrupts, both externally and internally asserted, may be enabled by increasing the number of bits in interrupt enable registers 252 and 253.

It should be noted that the synchronization of the DMA operations, as explained below, will primarily be controlled by way of the external interrupt lines INT0 through INT2, as the synchronization is most often necessary in such operations with external memory devices connected to microcomputer 10. However, the synchronization with internally asserted interrupts provided to DMA controller 22, and enabled by way of DMA interrupt enable register 253, also may be useful in certain situations.

As explained above, the interrupts to CPU 12 which are enabled by the contents of CPU interrupt enable register 252 have priority over the interrupts to DMA controller 252, if also enabled by DMA interrupt enable register 253. Accordingly, in order to have effect upon the DMA operation, a particular interrupt must not be enabled by CPU interrupt enable register 252 and must be enabled by DMA interrupt enable register 253

It is apparent from FIGS. 1 and 2 that the plurality of buses internal to microcomputer 10 can allow the simultaneous access of memories 16, 18 and 20, so long as no two of the buses 30, 34, or 38 are simultaneously accessing the same memory 16, 18 or 20 or simultaneously accessing external memory (via peripheral port 24 or 26). If this is the case, no bus arbitration is required to be enacted by controller 14, and the memory accesses can take place independently.

However, such simultaneous access may be requested, depending upon the instruction codes being executed. Accordingly, to prevent bus conflicts relative to memory access, controller 14 further includes memory arbitration logic 206. Memory arbitration logic 206 receives clock signals Q1 and Q2 from clock generator 200 and receives the address signals on each of the address lines of buses 30, 34 and 38. Memory arbitration logic 206 provides output signals on lines $SEL_{16}$, $SEL_{18}$, $SEL_{20}$ to each of memories 16, 18, and 20, respectively; memory arbitration logic 206 further generates the signals on lines $SEL_{24}$ and $SEL_{26}$ to peripheral ports 24 and 26, respectively. The purpose of memory arbitration logic 206 is to control the access to memories 16, 18 and 20, and external and input/output memories, according to a predetermined priority.

For purposes of the following examples, the priority will be presumed to be in the order of address lines 30a and 30b of data bus 30 having the highest priority, followed by address lines 34a of program bus 34, and followed by address lines 38a of DMA bus 38 with the lowest priority. This priority is chosen because of the construction of microcomputer 10, specifically CPU 12; the parallel connection of multiplier 46 and ALU 48 means that, for the digital signal processing applications intended for microcomputer 10, it is most likely that performance would be more significantly impacted if data communications were forced to wait because of instruction fetches, than vice versa. DMA operations can take lowest priority because of the minimal overall performance impact for most application programs resulting from slower DMA relative to the other operations. It should be noted, however, that other applications of the instant invention would be more favorably performed if the priority were altered. For example, for graphics applications, DMA may best be prioritized at the highest level if used to provide the video display refresh function. Accordingly, the priority illustrated herein is by way of example only.

Figure 5:
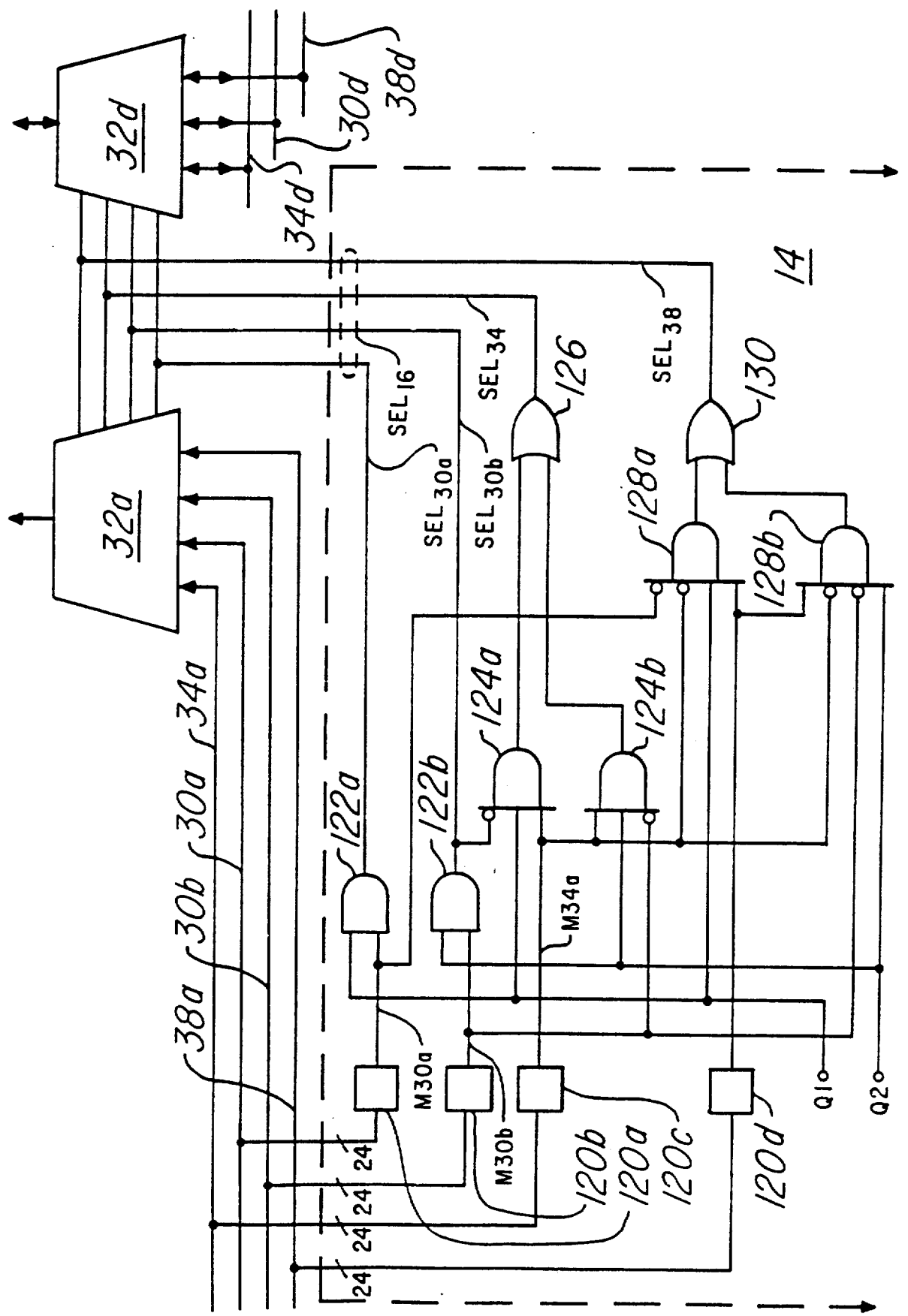
FIG. 5 is an electrical diagram, in schematic form, of logic within the controller of FIG. 4, useful in the arbitration of accesses to various memory entities within the microcomputer of FIG. 1.

Referring now to FIG. 5, the control of one of memory ports 32a by memory arbitration logic 206 within controller 14 illustrated. As described above relative to FIG. 1, each of memory ports 32a is connected to receive address signals from sets of address lines 30a and 30b of data bus 30, from address lines 34a of program bus 34, and from address lines 38a of DMA bus 38. Memory port 32a, as illustrated in FIG. 5, performs primarily a multiplexer function, as it receives said address lines at its inputs and connects the selected one of the address line sets to the decoder 33 of its associated memory 16, 18 or 20, responsive to signals from controller 14.

FIG. 5 is a logical schematic of a portion of memory arbitration logic 206 within controller 14 which controls one pair of ports 32a and 32d; by way of example, ports 32a and 32d shown in FIG. 5 are associated with RAM 16. As described above, a single memory address space is utilized by microcomputer 10 for all of the memories 16, 18 and 20 within microcomputer 10, and including the addresses of memory external to microcomputer 10 and accessible via peripheral ports 24 and 26. It should be recalled that the memory address space of microcomputer 10 is 16 Mwords ($2^{24}$ words, due to the twenty-four bits carried on each set of address lines in buses 30, 34 and 38). Using this single memory space, Table 3 shows the memory map of microcomputer 10 according to the preferred embodiment of the instant invention.

TABLE 3

| Address rane (hexadecimal) | Location/function |
|---|---|
| 000000 through 00003F | Interrupt handling |
| 000040 through 000FFF | ROM 20 |
| 001000 through 7FFFFF | External memory |
| 800000 through 800FFF | I/O & other memory mapped registers |
| 801000 through 8013FF | RAM 16 |
| 801400 through 8017FF | RAM 18 |
| 801800 through FFFFFF | External memory |

As stated above, the memory address space which refers to I/O and memory mapped registers is directed to peripheral port 26 (including, as will be discussed below, registers addressable by way of peripheral bus 28, including those in DMA controller 22, timer 40, serial port 42 and format converter 44), while the external memory access is generally handled via peripheral port 24.

Within memory arbitration logic 206 are decoders 120a through 120d which, for its associated one of the sets of address lines 30a, 30b, 34a and 38a, decodes sufficient ones of address lines therein to determine if the address value specified on the associated address lines has a value in the range for the given one of memories 16, 18 and 20 controlled thereby. For purposes of an example, assume that the one of ports 32a shown in FIG. 5 is associated with RAM 16; accordingly, port 32a of FIG. 5 should be responsive to an address value on one of the sets of address lines 30a, 30b, 34a or 38a which is between 801000$_h$ and 8013FF$_h$. It should be noted, of course, that one of ordinary skill in the art could design decoders 120a through 120d in such a manner as to take advantage of the "don't care" values of the least significant ten bits of the address lines. The output of each of decoders 120 is a logic "1" in the illustrated example of FIG. 5 in the event that the address lines connected thereto is within the range 801000$_h$ and 8013FF$_h$. The output lines from decoders 120a through 120d are M30A, M30B, M34A and M38A respectively, designating the presence or absence of a match between the address and the memory address space associated with RAM 16.

As described above, clock generator 200 of controller 14 generates two clock signals Q1 and Q2 which are utilized in the control of ports 32a. As discussed above, the system clock for microcomputer 10 corresponds to the clock signals on line CLKIN. Clock signals Q1 and Q2 are each associated with a phase of the system clock on line CLKIN. Clock signal Q1 is a "1" during the first quarter-cycle of the system clock, and clock signal Q2 is a "1" during the third quarter-cycle of the system clock.

Memory arbitration logic 206 shown in FIG. 5 uses these two clock signals Q1 and Q2 in order to time-multiplex the address signals on sets of address lines 30a and 30b with one another. Signal M30A shown in FIG. 5 is connected to a first input of AND gate 122a, while clock signal Q1 is connected to the second input of AND gate 122a. The output of AND gate 122a is therefore a "1" only when the address presented on address lines 30a of data bus 30 is within the memory space of RAM 16 (in the illustrated example) during the first quarter-cycle of the system clock. The output of AND gate 122a is connected to port 32a, and is designated SEL30A; port 32a is operable to select address lines 30a of data bus 30 for application to decoder 33 of RAM 16 responsive to line SEL30A in its "1" logic state. Conversely, line SEL30B is connected to the output of AND gate 122b, which performs the logical AND of the output of decoder 120b and clock signal Q2. Port 32a therefore only selects address lines 30b for application to decoder 33 of RAM 16 when the value on address lines 30b is between 801000$_h$ and 8013FF$_h$ during the third quarter-cycle of the system clock. It is therefore apparent from this description and from FIG. 5 that sets of address lines 30a and 30b of data bus 30 can never create a conflict for being directed to the same memory 16, 18 or 20 (or external) during a given cycle because of the time-multiplexing of the two addresses within a cycle performed by controller 14 as shown in FIG. 5. It should also be apparent that the addresses on sets of address lines 30a and 30b are at the highest priority, relative to the address lines in program bus 34 and DMA bus 38, since the value of the address values on buses 34 and 38 are not considered in the generation of the "1" logic state on lines SEL30A and SEL30B by controller 14.

Such priority control is enabled by controller 14 relative to address lines 34a of program bus 34, and address lines 38a of DMA bus 38. Decoder 122c which receives address lines 34a of program bus 34 at its input, and generates a "1" logic state on line M34A responsive to the address value being between 801000$_h$ and 8013FF$_h$, similarly as decoders 122a and 122b. Line M34A is connected to one input of each of AND gates 124a and 124b, which generates a signal at its output corresponding to the logical AND of its three inputs. A second input of AND gate 124a is connected to clock signal Q1, and a third, inverted, input of AND gate 124a is connected to line M30A; accordingly, the output of AND gate 124a is at a "1" logic state corresponding to the address value on address lines 34a corresponding to a memory location in RAM 16 (in this example) during the first quarter-cycle of the system clock, if and only if the address value of address lines 30a of data bus 30 does not so correspond to a RAM 16 memory location. This "1" logic state is applied to port 32a on line SEL34, indicating that address lines 34a of program bus 34 is to be selected for application to RAM 16, via OR gate 126. The application of address lines 34a to RAM 16 by port 32a is similarly enabled by AND gate 124b, so long as line M30B is low (i.e., the address on address lines 30b corresponds to a memory location outside of the memory space for RAM 16).

The selection of address lines 38a of DMA bus 38 by port 32a is enabled by a "1" logic state on line SEL38. Similarly as the "1" logic state on line SEL34, the "1" logic state on line SEL38 is generated by way of decoder 120d (having line M38A at its output which has a "1" logic state when the address value of lines 38a are within the address space of RAM 16), AND gates 128a and 128b, and OR gate 130. AND gates 128a and 128b each have a fourth, inverted, input, however, which is connected to line M34A from the output of decoder 120c. Accordingly, the selection of address lines 38a of DMA bus 38 is at even a lower priority than address lines 34a of program bus 34, since in order to generate a "1" state on line SEL38, since both the address value on address lines 30a (or 30b, depending upon which quarter-cycle is current) of data bus and the address value on address lines 34a must not correspond to a memory location within RAM 16 (in this example).

As shown in FIG. 5, port 32d is similarly enabled by lines $SEL_{16}$ (i.e., lines SEL30A, SEL30B, SEL34, and SEL38) to select the proper data lines of data bus 30, 34 or 38 for connection to the corresponding memory (in this example, RAM 16). Since data lines 30d are accessed by both address lines 30a and address lines 30b of data bus 30, lines SEL30A and SEL30B are ORed for purposes of the selection of data lines 30d of data bus 30. It should also be noted that ports 32a and 32d are each tri-stated in the event that none of the address lines 30a, 30b, 34a or 38a are within the address space of the corresponding memory. This precludes the associated memory from interfering with data lines 30d, 34d, or 38d when not selected.

As shown above in FIGS. 1 and 4, memory arbitration logic 206 in controller 14 generates select outputs via lines $SEL_{18}$ and $SEL_{20}$ to ports 32a and 32d of memories 18 and 20, respectively. In addition, memory arbitration logic 206 provides select outputs via lines $SEL_{24}$ and $SEL_{26}$ to peripheral ports 24 and 26 in a fashion similar as that described hereinabove relative to FIG. 5. Within peripheral ports 24 and 26, multiplexers 100, 102, 106 and 108 of FIG. 3 are enabled based on the same priority scheme, depending upon the address values on said address lines 30a, 30b, 34a and 38a.

Control of read and write operations for the various memory devices is accomplished by way of certain of the control outputs from sequential logic 202b in control logic 202 of controller 14, shown in FIG. 4. This function, as the other control functions performed by controller 14, occurs responsive to the instruction codes received and decoded by controller 14.

Figure 5A:
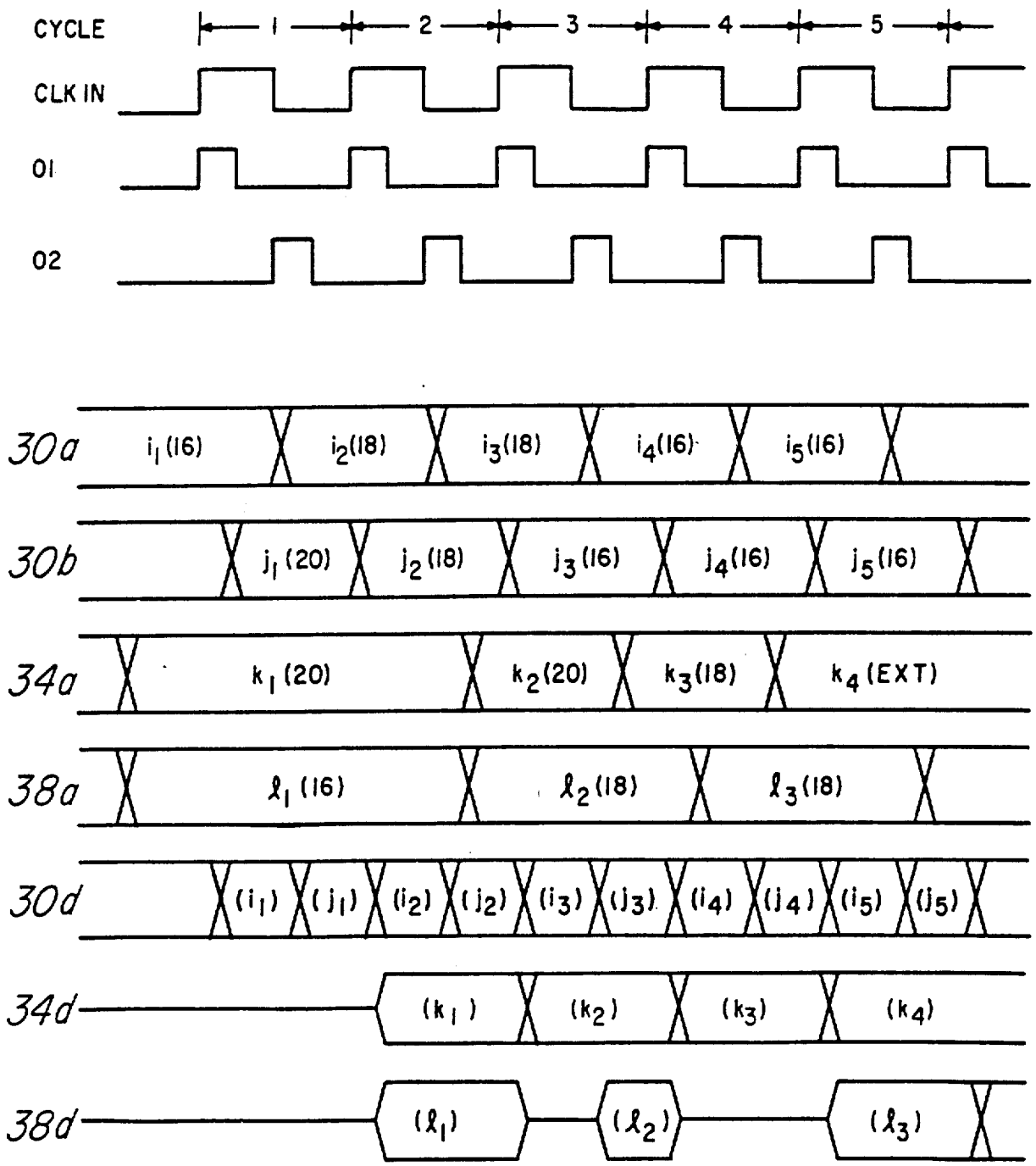
FIG. 5a is a timing diagram of memory accesses performed within the microcomputer of FIG. 1, illustrating the operation of the logic cf FIG. 5.

Referring now to FIG. 5a, the timing and prioritization of a series of memory accesses is shown in order to illustrate the parallel and dual access features of the instant invention. The top line of FIG. 5a illustrates the operation of the system clock signal on line CLKIN, with the cycles numbered for ease of correlation with the description hereinbelow. Clock signals Q1 and Q2 are illustrated as described hereinabove, with clock signal Q1 active during the first quarter-cycle of the system clock period, and with clock signal Q2 active during the third quarter-cycle of the system clock period. For purposes of clarity, the examples illustrated in FIG. 5a are all read accesses to the various memories. It should be noted that write accesses to RAMs 16 and 18, and to external memory, are prioritized and granted in the same way as the read accesses shown in FIG. 5a, only with the memories responsive to writing in the value of the associated data lines.

During the first cycle of system clock CLKIN shown in FIG. 5a, address lines 30a are carrying an address value $i_1$, which corresponds to a memory location in RAM 16; similarly, address lines 30b are carrying an address value $j_1$, which corresponds to an address value in ROM 20. Responsive to clock signal Q1 active, RAM 16 presents the contents of memory location $i_1$ on data lines 30d of data bus 30. Responsive to clock signal Q2 active in the third quarter-cycle of system clock CLKIN, ROM 20 presents the contents of memory location $j_1$ on data lines 30d of data bus 30. Of course, since address lines 30a and 30b are referring to different memories, no conflict arises therebetween.

Also during the first cycle of system clock CLKIN shown in FIG. 5a, address lines 34a of program bus 34 are carrying an address value $k_1$ which also corresponds to a memory location in ROM 20. Since address lines 30b of data bus 30 have priority over address lines 34a of program bus 34, ROM 20 is not responsive to address lines 34a since address lines 30b are granted access to ROM 20. Accordingly, data lines 34d of program bus 34 remain in a high-impedance state, since no other memory is accessed by address value $k_1$, and since RAM 16 is accessed instead by address lines 30a and 30b. Similarly during the first cycle, address lines 38a of DMA bus 38 are carrying address value $l_1$ which corresponds to a memory location in RAM 16; since address lines 38a have a lower priority than address lines 30a of data bus 30, data lines 38d of DMA bus 38 are also in a high-impedance state. Since a conflict in the attempted access of a single memory device by two of buses 30, 34 and 38 has occurred, controller 14 will cause, via control logic 202, the desired memory address of the lower priority bus to continue to be presented, so that as soon as access to the memory can be granted, the execution of the program will begin again from the same point for the one of buses 34 or 38 denied access.

In the second cycle shown in FIG. 5a, address lines 30a and 30b present address values $i_2$ and $j_2$, respectively, to RAM 18; accordingly, data lines 30d are presented with the contents of memory locations $i_2$ and $j_2$ responsive to clock signals Q1 and Q2, as in the first cycle. No conflict occurs because of address lines 30a and 30b both referring to RAM 16, since the separate sets of address lines 30a and 30b are controlled, by operation of controller 14 as described relative to FIG. 5, to be presented to RAM 16 at separate times within the system clock period. Address lines 34a of program bus 34 continue to carry address value $k_1$ which corresponds to a memory location in ROM 20; since address lines 30a and 30b are accessing RAM 16, program bus 34 is then granted access to ROM 20, and responsive to clock signal Q1, the contents of memory location $k_1$ in ROM 20 are presented on data lines 34d of program bus 34. Also during the second cycle shown in FIG. 5a, address lines 38a of DMA bus 38 continue to carry address value $1_1$ corresponding to a memory location in RAM 16; since neither data bus 30 nor program bus 34 has been granted access to RAM 16, RAM 16 presents the contents of memory location $1_2$ on data lines 38d of DMA bus 38, responsive to clock signal Q1. It is therefore apparent that microcomputer 10, constructed according to the instant invention, is capable of having three parallel accesses to three different memory locations occurring simultaneously. Taking into consideration the intra-cycle multiplexing of sets of address lines 30a and 30b of data bus 30, the capability of four memory accesses within a single system clock cycle may be performed.

The third cycle of system clock CLKIN illustrated in FIG. 5a shows the effect of address lines 30a of data bus 30 taking priority over address lines 38a of DMA bus 38. As clock signal Q1 goes active, both address lines 30a and address lines 38a are carrying address values within the address space of RAM 18 (values $i_3$ and $1_2$, respectively). Accordingly, data bus 30 is granted access to RAM 18 over DMA bus 38; data lines 30d of data bus thus are presented with the contents of memory location $i_3$, while data lines 38d of DMA bus 38 go to a high-impedance state. However, upon clock signal Q2 going active, address lines 38a of DMA bus are granted access to RAM 18, since address lines 30a of data bus 30 are granted access only responsive to clock signal Q1. Since address lines 30b are carrying address value $j_3$ corresponding to a memory location in RAM 16, address lines 38a access RAM 18, so that data lines 38d are presented with the contents of memory location $1_2$ of RAM 18 responsive to clock signal Q2.

In the fourth cycle shown in FIG. 5a, address lines 34a are carrying address value $k_3$, which correspond to a memory location in RAM 18; similarly, address lines 38a are carrying address value $1_3$, also corresponding to a memory location in RAM 18. As described above, program bus 34 is granted priority over DMA bus 38. Accordingly, responsive to clock signal Q1, data lines 34d of program bus 34 are presented with the contents of memory location $k_3$ of RAM 18, while data lines 38d of DMA bus 38 are in their high-impedance state. The fifth cycle shown in FIG. 5a illustrates that external memory can be accessed by address lines 34a, carrying an address value $k_5$ corresponding to a memory location in external memory; DMA bus 38 and data bus 30 are active simultaneously with the access of external memory by program bus. As described above, the external memory access will occur by way of peripheral port 24; as will be described below, during a DMA operation, peripheral port 26 will be disabled.

In addition, it should be noted that the source of the address and data information, and the destination of the data, sought by said buses 30, 34 and 38 is not specified in the above description relative to FIGS. 5 and 5a. As described above, however, one of the primary functions of controller 14 in its decoding and execution of instruction codes is to control the various functional blocks of microcomputer 10 so that no two functional blocks (e.g., peripheral port 24 and CPU 12) attempt to take control of the same bus (e.g., data bus 30). Such bus control and arbitration at the end of the bus away from the memories 16, 18 and 20 (or external memory) is performed by controller 14 in a manner which is well known in the art, and which is performed in many general and special purpose microprocessors and microcomputers currently available.

It is therefore apparent from the description hereinabove that various combinations of memory utilization may be effected within the single address space of microcomputer 10. This is made possible by the accessibility of each of the various memory entities (i.e., RAM 16, RAM 18, ROM 20 and external memory) by each of the three buses 30, 34 and 38. Accordingly, while controller 14 addresses and receives the instruction codes by way of program bus 34, such addresses may reside in RAM 16 along with the data memory accessible by CPU 12 using data bus 30. This organization therefore makes possible a von Neumann application for microcomputer 10, by using a single memory (e.g., RAM 16) as both program and data memory, with no partitioning required within RAM 16 to effect this operation. However, microcomputer 10 can also be utilized in a Harvard configuration by storing program memory in ROM 20, for example, and by storing data memory in RAM 16. Controller 14 can then access ROM 20 for instruction codes concurrently with CPU 12 accessing RAM 16 for data operands, thereby achieving the performance improvement of a Harvard machine, in return for partitioning memory accordingly. In addition, some benefits of both a von Neumann and a Harvard configuration can be achieved by using a single memory such as RAM 16, because of the dual access feature of microcomputer 10. The dual access feature allows two accesses in a single system clock cycle, even to the same memory, because of the time-multiplexed feature used by data bus 30. This allows the same physical memory space to be used for both data and program memory, while still achieving the performance advantage of two separate memories. It should also be apparent that, besides being configurable into the two configurations, microcomputer 10 can be so reconfigured dynamically, so that certain tasks may be performed in a von Neumann manner and certain other tasks in a Harvard manner. Accordingly, microcomputer 10 constructed according to the instant invention allows the user to optimize microcomputer 10 based upon the desired application.

Figure 6:
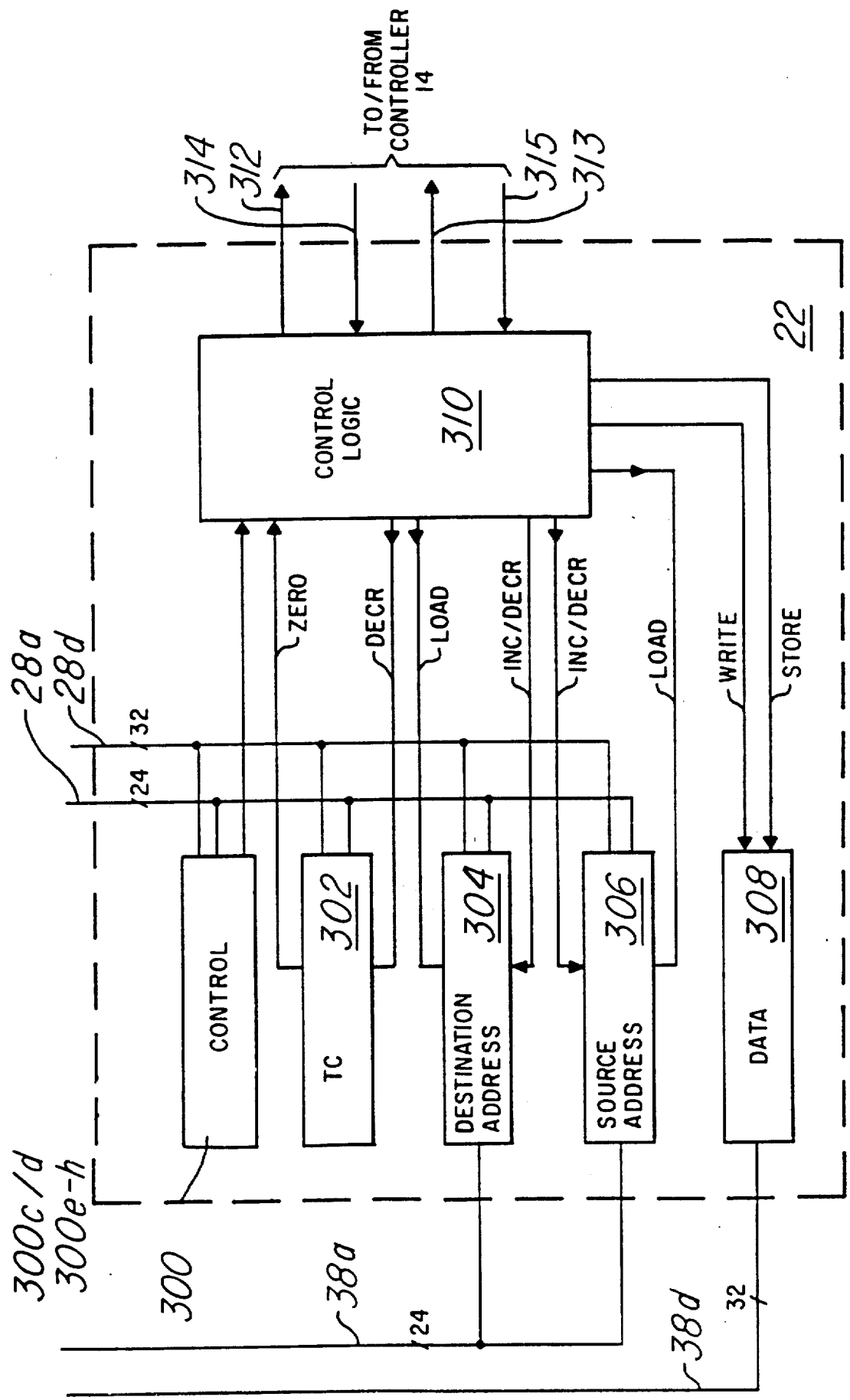
FIG. 6 is an electrical diagram, in block form, of the DMA controller of the microcomputer of FIG. 1.

Referring now to FIG. 6, the construction and operation of DMA controller 22 will be described. As is well known, direct memory access operations are useful in moving blocks of stored data from one memory area to another without intervention of the central processing unit (e.g., CPU 12). For microcomputer 10 described herein, direct memory access is also useful for moving blocks of data between external memory and on-chip memories 16 and 18. As shown in FIGS. 1 and 6, DMA controller 22 is connected to DMA bus 38 and to peripheral bus 28, for communication of data on DMA bus 28 and for receipt of control and source/destination address information from peripheral bus 28.

It should be noted that peripheral bus 28 contains address lines 28a and data lines 28d, which carry address information and data, respectively, in the same manner as data bus 30, program bus 34, and DMA bus 38 discussed heretofore. Referring back to FIG. 1, it is apparent that address lines 28a and data lines 28d of peripheral bus 28 are directly connected, and therefore correspond, to the lines I/OA$_n$ and I/OD$_n$, respectively, at the output of peripheral port 26. Accordingly, in order to present an address, or communicate data from or to, peripheral bus 28, the desired address must correspond to a value within the memory address space of microcomputer 10 which corresponds to an address serviced by peripheral port 26. The memory-mapped registers within DMA controller which are described below are therefore within the memory address space 800000$_h$ through 800FFF$_h$ referred to above in Table 3.

DMA controller 22 contains control register 300, transfer counter register 302, destination address register 304 and source address register 306, each of which are connected to address lines 28a and data lines 28d of peripheral bus 28, and each of which are mapped into unique address locations of the memory address space of microcomputer 10. DMA controller 22 further contains data register 308, which is connected to data lines 38d of DMA bus 38; address lines 38a of DMA bus are connected to destination address register 304 and source address register 306. Control logic 310 is connected to control register 300 so that the contents of the bits therein will effect the control of DMA controller 22. Control logic 310 generates a signal to transfer counter register 302 on line DECR and receives a signal from transfer counter register 302 on line ZERO. Control logic 310 provides signals to destination address register 304 and source register 306 on lines LOAD and INC/DECR; control logic further provides signals to data register 308 on lines WRITE and STORE. To effect the desired memory read/write operations, control logic 310 generates read/write signals which are connected to controller 14, so that controller 14 can generate such control signals to memories 16, 18 and 20, and to peripheral ports 24 and 26, as discussed above relative to memory access control by controller 14.

Figure 7:
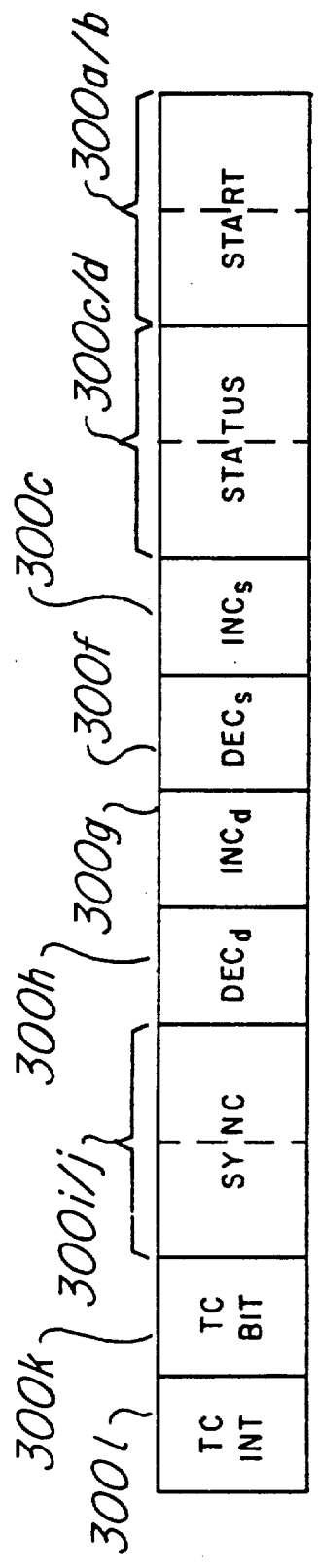
FIG. 7 is a diagram illustrating the contents of the control register of the DMA controller of FIG. 7.

Control register 300 is a twelve-bit addressable register which is written to in order to configure DMA controller 22; the contents of control register 300 are illustrated in FIG. 7, and are described in further detail below. Transfer counter register 302 is a twenty-four bit addressable register, and which is to be loaded from peripheral bus 28 with the number of memory locations to be transferred in the DMA operation. Transfer counter register 302 is decremented by a pulse on line DECR, and sends a signal to control logic 310 on line ZERO when its contents equal zero. Source address register 306 and destination address register 304 are addressable twenty-four bit registers which store the memory addresses from and to which data are to be transferred, respectively. The contents of source address register 306 and destination address register 304 are originally loaded from the twenty-four least significant bits of data lines 28d of peripheral bus 28; depending upon the contents of control register 300, source address register 306 and destination address register 304 are incremented or decremented responsive to pulses on lines INC/DECR from control logic 310. Data register 308 is a temporary register for buffering data from data lines 38a of DMA bus 38; the value on data lines 38d are loaded into data register 308 responsive to a signal on line WRITE, and the contents of data register 308 are presented to data lines 38d responsive to a signal on line STORE.

Referring now to FIG. 7, the contents of control register 300 will be described in detail, relative to the operations controlled thereby. Control register 300 contains two START bits 300a and 300b, which control the starting and stopping of the DMA operation. As described above generally, it is useful to control a DMA operation so that it may stop at various points therein, without loss of context and without performing reads or writes which will necessarily need to be repeated upon restart of the DMA operation. Accordingly, START bits 300a/b contain a two-bit code for indicating the start and stop condition selected by the user of microcomputer 10, according to Table 4 below.

TABLE 4

| Bits 300 a/b | Start/stop condition |
|---|---|
| 00 | Abort transfer; reset to read |
| 01 | Stop upon completion of current read or write |
| 10 | Stop upon completion of current transfer (i.e., after the next write) |
| 11 | Restart from current condition |

Bits 300c and 300d are read-only bits (relative to microcomputer 10) which DMA controller 22 writes with the status of the DMA operation being performed. Table 5 illustrates the states indicated by the various codes which can be contained within bits 300c and 300d of control register 300.

TABLE 5

| Bits 300 c/d | Status |
|---|---|
| 00 | DMA being held between write and read |
| 01 | DMA being held between read and write |
| 11 | DMA busy |

State 10 is undefined. As will be illustrated below relative to FIG. 8, the status of bits 300c/d of control register 300 are not only readable by the remainder of microcomputer 10, but will also be used in the control flow of a DMA operation.

Source INC/DEC bits 300e and 300f indicate, when set, whether the contents of source address register 306 are to be incremented or decremented, respectively, upon completion of the DMA read. If INC/DEC bits 300e and 300f are both set or both reset, the contents of source address register 306 will not be modified after the DMA read. Destination INC/DEC bits 300g and 300h similarly control the modification of destination address register 304 after the completion of a DMA write.

Sync bits 300i and 300j allow configuration of the synchronization of DMA controller 22 with either the source or destination of the transferred data. Interrupt synchronization of the DMA operation allows the DMA operation to be controlled so that the receipt or transmission of data from external sources can be done without conflict among CPU 12, DMA controller 22, and the external source, even though operating at different speeds. As mentioned above, the interrupt synchronization occurs relative to system interrupts (asserted externally or internally), rather than by dedicated DMA interrupt pins, reducing the number of external terminals, accordingly. In addition, the use of system interrupts to control the DMA operation also requires only a single interrupt connection between the external device and microcomputer 10, rather than requiring multiple interrupt lines connected between the external device and microcomputer 10 and the associated decoding circuitry at the external device to properly assert the CPU and DMA interrupt lines, as necessary. Table 6 lists the synchronization modes performable by DMA controller 22, according to the states of bits 300i and 300j.

TABLE 6

| Bits 300 i/j | Interrupt synchronization |
| --- | --- |
| 00 | No interrupt synchronization. |
| 01 | Source synchronization; DMA read on interrupt, write when available |
| 10 | Destination synchronization; DMA read when available; write on interrupt |
| 11 | Source and destination sync; DMA read on interrupt; write on next interrupt |

The state of TC bit 300k of control register 300 indicates to control logic 310 whether or not the DMA transfer is to occur for a predetermined number of cycles, as stored in transfer counter register. When TC bit 300k is set to a "1" state, the DMA transfer is terminated upon transfer counter register 302 reaching zero, and when reset to a "0" state, TC bit 300k indicates that the DMA transfer is not controlled by the contents of transfer counter register 302 (i.e., the transfer is not terminated on transfer counter register 302 reaching zero).

TCINT bit 300l, when set to a "1" state, indicates to control logic 310 that an internal interrupt is to be issued to interrupt control logic 250 (i.e., an internal interrupt enabled by bits DINT of interrupt enable registers 252 and 253), when the contents of transfer counter register 302 reach zero. When reset, no such interrupt is asserted.

Figure 8:
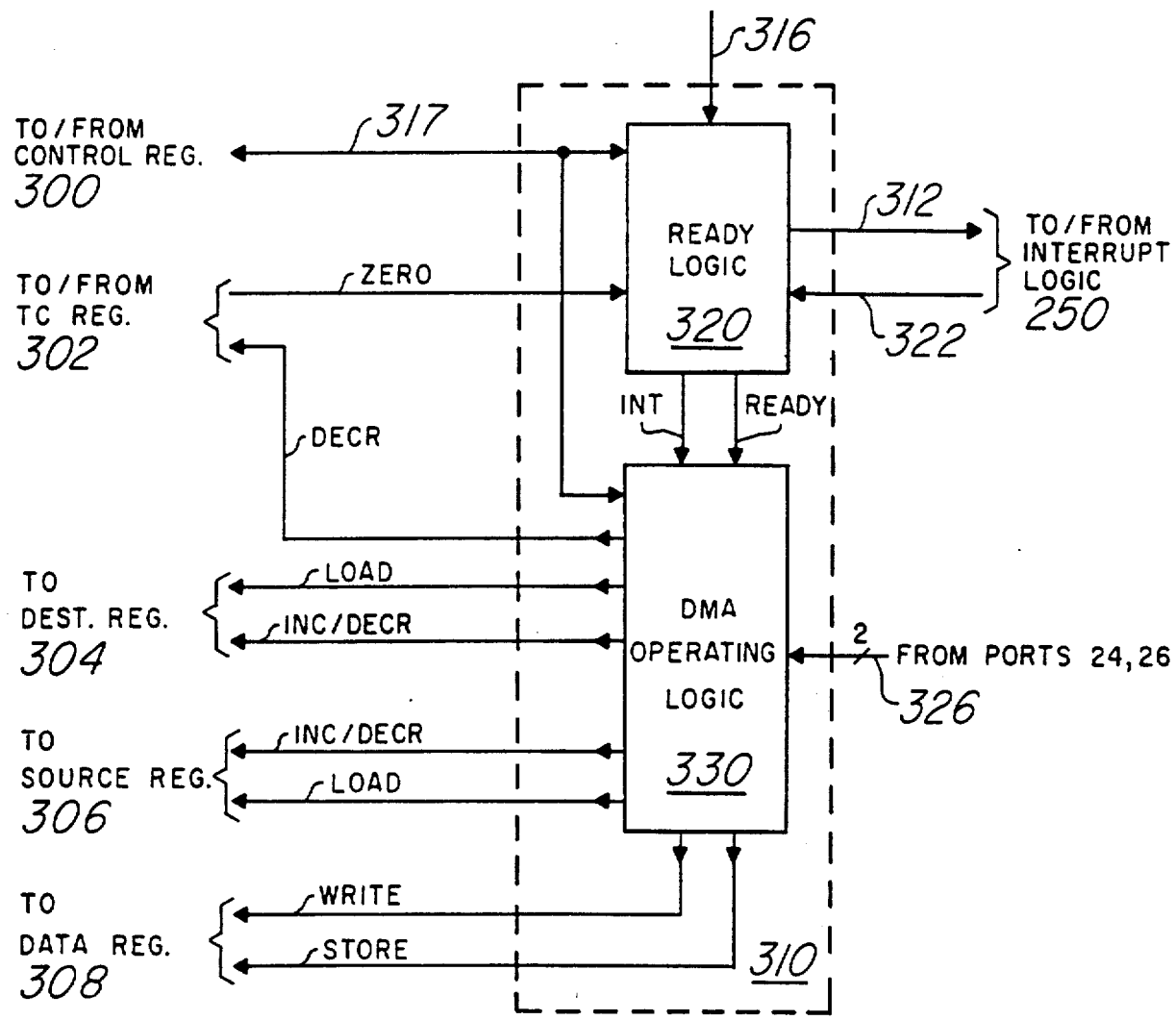
FIG. 8 is an electrical diagram, in block form, of the construction of control logic within the DMA controller of FIG. 7.

Control logic 310 communicates with controller 14 so that the DMA controller 22 operates consistently with the rest of microcomputer 10. Referring to FIG. 8, control logic 310 is illustrated as containing ready logic 320 and operating logic 330. Ready logic 320 communicates with controller 14 by way of line 312, which ready logic 320 asserts as an internal interrupt signal at the end of a DMA transfer (according to the state of bit TCINT discussed above), and line 322, upon which ready logic 320 receives an enabled interrupt received signal from interrupt logic 250 in response to an interrupt being received by interrupt logic 250 which is enabled for purposes of DMA, as described above. Ready logic 320 further receives a reset signal on line 316 from controller 14. With respect to the remainder of DMA controller 22, ready logic 320 receives line ZERO from TC register 302, and communicates with control register 300 via bus 317. Ready logic 320 also has an output on line READY, which it presents to DMA operating logic 330 to indicate that a DMA transfer is to begin, and on line INT, by which ready logic 320 communicates that an enabled interrupt has been received, as indicated by line 322.

Operating logic 330 performs the function of controlling communication between various registers within DMA controller 22 and DMA bus 38a and 38d at such time as required during a DMA transfer. Operating logic 330 is bidirectionally connected to control register 300 by way of bus 317. Lines LOAD and INC/DECR output signals from operating logic 330 to source register 306 and to destination register 304. Line DECR connects operating logic 330 to TC register 302. Control of data register 308 is accomplished by operating logic 330 by way of lines WRITE and STORE. The operation of these lines will be described with reference to FIGS. 9a and 9b hereinbelow.

As described above, the DMA operation performed under the control of DMA controller 22 can be interrupt-synchronized. Also as described above relative to controller 14, internally generated interrupts are received and handled by interrupt logic 250 therein. In the event that interrupt logic 250 receives an interrupt which is enabled by the corresponding bit in DMA interrupt enable register 253 but which is not enabled by the corresponding bit in CPU interrupt enable register 252, controller 14 will signal ready logic 320 by way of line 322. Ready logic 320 communicates the same to operating logic 330 via line INT. Operating logic 330 further receives signals on line 326 from ports 24 and 26, indicating that the memory or input/output device being accessed is busy.

In operation, transfer counter register 302, destination address register 304, and source register 306 are first loaded with the initial conditions as desired. Each of these registers 302, 304 and 306 are addressable by address lines 28a of peripheral bus 28 using a normal memory write instruction executed by microcomputer 10; implicit in FIG. 6 for each of the registers 302, 304, and 306 is decoding logic for controlling the loading of said registers 302, 304 and 306 when addressed. Control register 300 is also loaded by addressing its memory location, thereby configuring DMA controller 22 as desired.

Figure 9A:
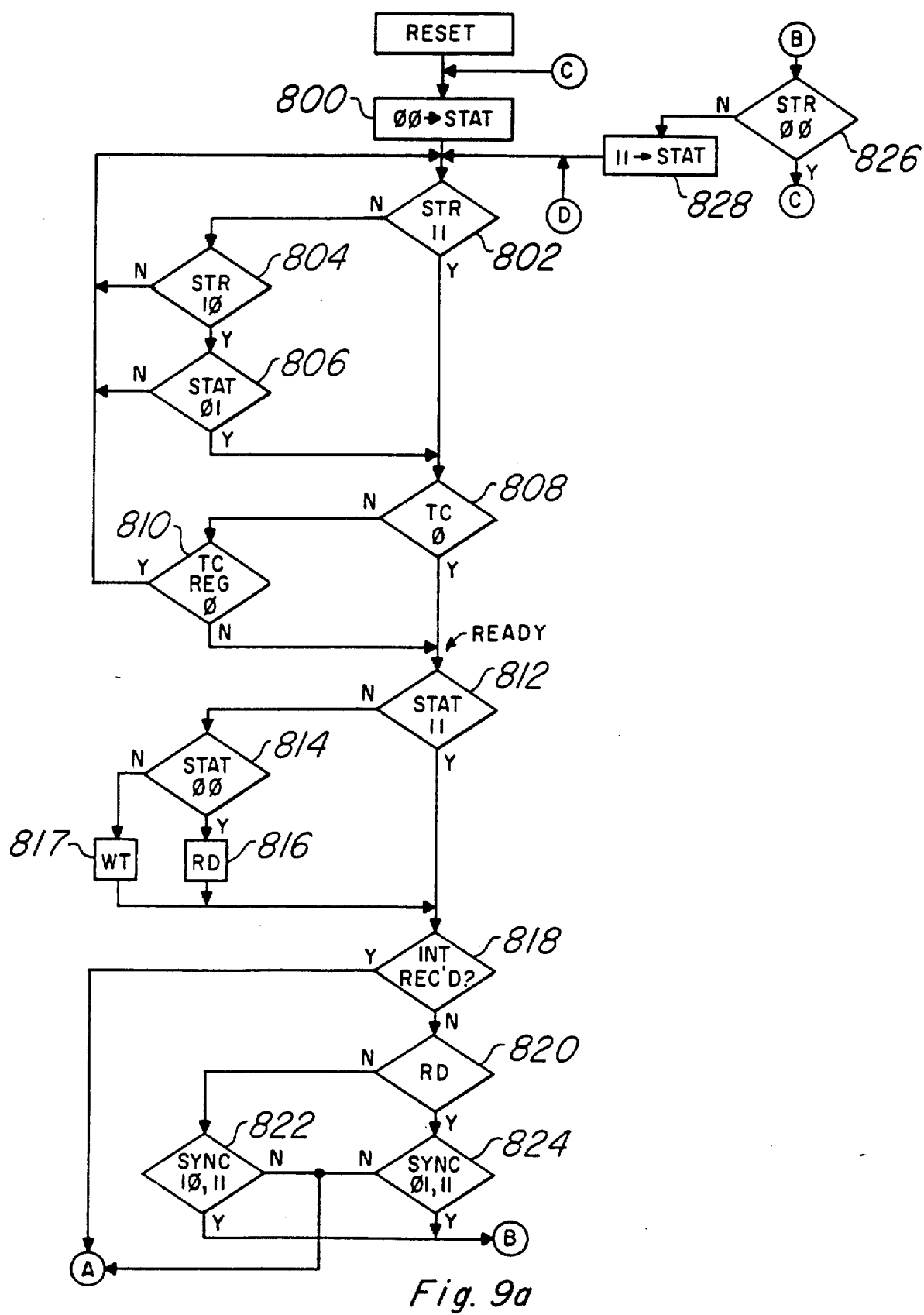
FIGS. 9a and 9b are flow charts illustrating the operational sequence of a DMA operation of the DMA controller of FIG. 7.
Figure 9B:
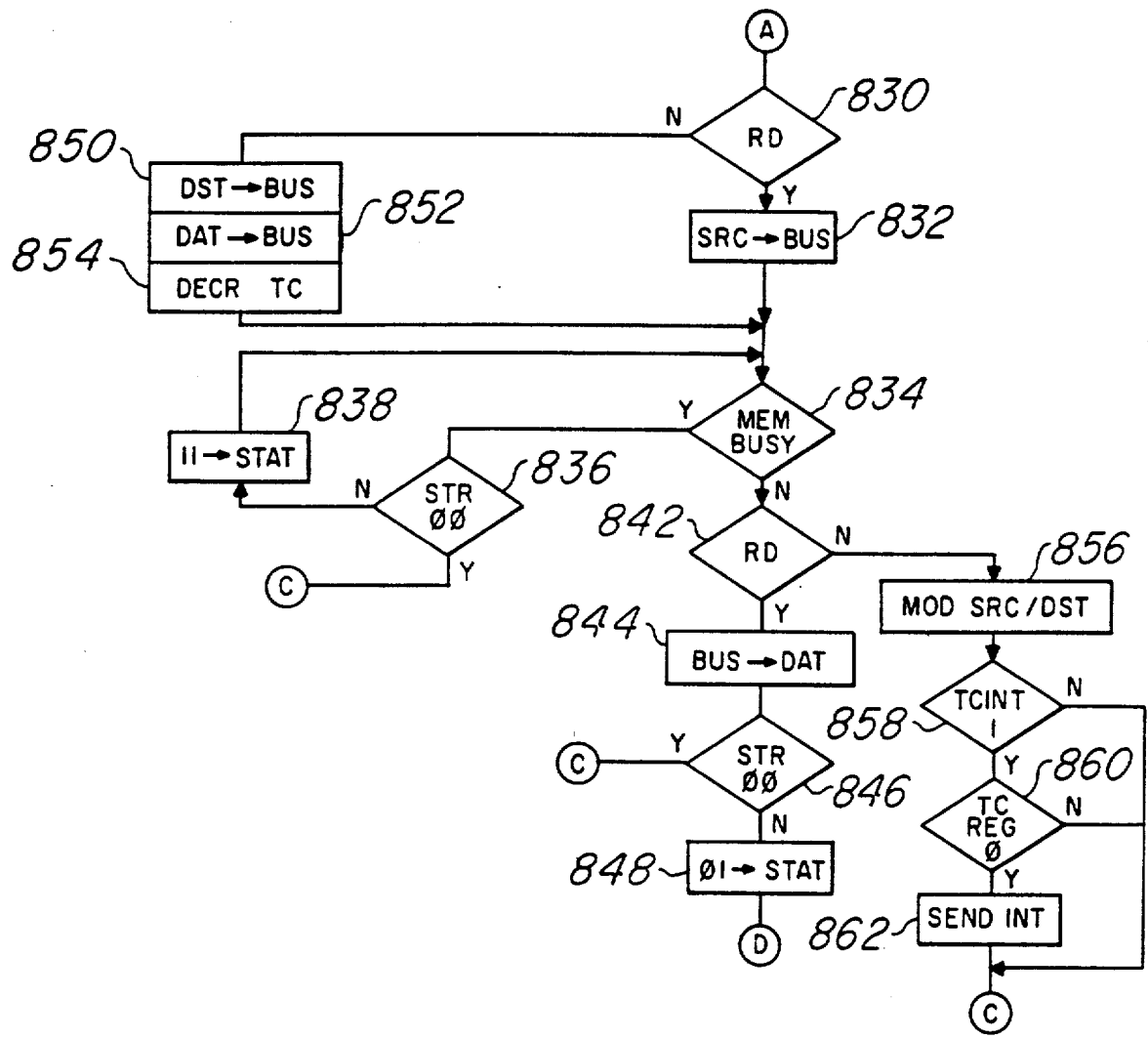

Referring now to FIGS. 9a and 9b, the operation of DMA controller 22 will be described. The detailed construction of ready logic 320 and operating logic 330 within control logic 310 will not be described herein for the sake of brevity, but consists of such combinational logic as required to accomplish the functions described below with reference to the flows of FIGS. 9a and 9b. The actual logic contained therein is such as can be easily constructed by one of ordinary skill in the art.

The operation of a DMA transfer will be described herein, beginning with a hardware reset asserted by line 316 of FIG. 8. As shown by step 800, the value 00 is written at reset into status bits 300c/d of control register 300. To effect the beginning of the DMA transfer, ready logic 320 examines start bits 300a/b of control register 300, shown by steps 802 and 804 of FIG. 9a. As described above, if the value 11 in bits 300a/b indicate that the user wishes to begin the DMA transfer from the current condition, DMA controller 22 will proceed with the transfer. If the value in bits 300a/b is 10 (step 804), indicating that the DMA transfer is to be stopped only after completion of the write, the contents of status bits 300c/d will be examined in step 806. If start bits 300a/b contain either a 00 or a 01 code, the DMA transfer will not continue. As shown in Table 4, the 00 start code indicates unconditional stopping of the DMA transfer, and the 01 code indicates that the DMA transfer is to be stopped after the current operation (no such operation yet beginning at this point in the flow). If the transfer is not to begin, ready logic 320 will loop to repeatedly examine the contents of start bits 300a/b to detect the writing of a different code thereinto. If bits 300a/b contain the value 01 at step 804, step 806 is performed to determine if the DMA transfer is between a read and a write (i.e., if status bits 300o/d contain the value 01). If such is the case, the transfer will proceed.

At step 808 shown in FIG. 8a, TC bit 300k of control register 300 is examined to determine if the contents of TC register 302 will be controlling the DMA. If TC bit 300k contains a 0, the transfer will proceed regardless of the contents of TC register 302. If TC bit 300k contains a 1, indicating that the DMA is to stop when the contents of TC register 302 are zero, line ZERO shown in FIGS. 6 and 8 is evaluated by ready logic (step 810) and, if indicating that the contents of TC register 302 are zero, ready logic 320 will not proceed with the DMA and will return to step 302 to reevaluate the contents of start bits 300a/b, and the contents of TC bit 300k and TC register 302. If the contents of TC register 302 are non-zero, or if TC register 302 is not controlling the DMA, the transfer will continue by ready logic 320 asserting line READY to operating logic 330.

Operating logic 330, in step 812, evaluates the contents of status bits 300c/d to determine if a read or a write is to be set by the operating logic 330. As shown in Table 5, status bits 300 c/d containing the code 11 indicates that a DMA is in progress; operating logic 330 will thus unconditionally continue the DMA transfer without resetting either condition. If the code in status bits 300c/d is not 11, step 814 determines if the transfer is between a write and a read (i.e., at the beginning of a new DMA transfer), or between the read and the write within a DMA transfer. In this example proceeding from the reset condition, the contents of status bits 300c/d will contain the value 00 from step 800, and thus a read operation will occur (step 816).

In step 818, operating logic 330 evaluates line INT from ready logic 310 to determine if an enabled interrupt has been received. If such an interrupt has been received, the operation will proceed to point A of FIG. 9b, from which the operation of the DMA will be discussed below. If no interrupt has been received, operating logic 330 will evaluate the contents of sync bits 300i/j of control register 300 to determine if interrupt synchronization is desired (i.e., since no interrupt is received, it must be determined if an interrupt is needed to continue). Step 820 first is performed to determine if the transfer is prior to a read or a write operation. If prior to a write operation, and if sync bits indicate that neither destination synchronization nor source and destination synchronization are asserted (bits 300i/j neither 10 nor 11), the DMA operation will proceed from point A.

Referring back to the immediate example, since the DMA transfer is beginning from reset, the transfer is at a point prior to a read operation. Sync bits 300i/j are thus evaluated by operating logic 330 in step 824 to determine if either source synchronization or source and destination synchronization are desired (i.e., sync bits 300i/j either 01 or 11). If either is required and no interrupt has occurred, control of the operation passes to point B on FIG. 9a, where start bits 300a/b are evaluated in step 826 to determine if an abort is being called. If so, the DMA operation begins again from step 800, resetting the contents of status bits 300c/d. If no abort is called, status bits 300c/d are loaded with the busy code (11, from Table 5), and the operation begins again from step 802. It should be noted that the loading of the code 11 into status bits 300c/d allows the operation to proceed (after evaluation of the start bits 300a/b in step 802 et seq.), without resetting the read and write condition in steps 814, 816 and 817. In effect, if source synchronization is desired and no interrupt occurs, control of the operation passes through a loop, exiting either to completion of the transfer upon receiving an interrupt (step 818), or to the reset condition upon receiving the abort code (step 826).

Beginning with point A of FIG. 9b, where an interrupt has been received, or if no interrupt has been received but synchronization is not required, step 830 determines if the transfer is prior to a read or to a write. In the example beginning from reset where a read is first to be performed, DMA operating logic 330 will place a signal on line LOAD to source register 306 to cause it to place its contents onto address lines 38d of DMA bus 38 (step 832); operating logic 330 will also cause the assertion of such control signals to the necessary source location for the DMA operation (e.g., via port 24), to effect the read operation. If external memory is being addressed, generally requiring multiple clock cycles to complete the access, a busy signal will be received by operating logic 330 on lines 326 from the appropriate port 24 or 26, indicating that an access is in progress to the addressed source location; such a busy signal can be generated from the complement of the RDY$_{13}$ signal received by port 24 of FIG. 3, for example. Internal memory such as RAM 18 may be accessed in the DMA transfer, also, although the access will occur within a machine cycle as described above, minimizing the busy time in the DMA transfer. So long as the memory is busy (step 834), operating logic 330 will examine start bits 300a/b to look for the abort code 00 (step 836) and, if not received, will place the DMA busy code 11 in status bits 300c/d of control register 300 (step 838). This loop will be repeatedly performed until the busy signal from the accessed memory is removed, indicating that the memory access is complete. If the abort code is received by start bits 300a/b during this loop, the DMA operation will unconditionally abort and will transfer control to step 800 of FIG. 9a.

Upon completion of the memory access, in this case a read, operating logic 330 will assert line STORE to data register 308 so that the logic states on data lines 38d will be loaded into data register 308 (step 844). If the abort code 00 is not present in start bits 300a/b (step 846), the code 01 will be loaded by operating logic 330 into status bits 300c/d of control register 300, indicating that the DMA transfer is now between the read and the write operations.

Once the read is completed, ready logic 320 again analyzes the start bits 300a/b in step 802 to determine the code therein; as shown in Table 4, a start code 11 will unconditionally continue the DMA operation. If start bits 300a/b contain the code 01, indicating that the DMA operation is to be stopped at the end of the current operation (i.e., the read operation just completed), ready logic 320 will enter the loop of steps 802 and 804 to examine the contents of start bits 300a/b until changed. In the example described herein, if start bits 300a/b contain the code 10 (indicating that the DMA transfer is to be aborted at the end of the current write operation), since status bits 300c/d contain the code 01 from step 848, the operation will continue with step 808. Since the contents of TC register 802 are not changed by the performance of a read, ready logic will assert line READY to operating logic 330 after completing step 808 or step 810, as the case may be.

Since status bits 300c/d contain the code 01 at steps 812 and 814, operating logic 330 will be set up for the write operation (step 817). The program loop by which an interrupt is either detected, or not detected and determined not to be needed will be performed in steps 818, 820, and 822 as described above for the read operation so that the write operation is held awaiting an interrupt in the event that either destination synchronization or source and destination synchronization is desired.

Control again begins at point A of FIG. 9b once all necessary interrupts are received. In the write operation, operating logic 330 causes destination register 304 to place its contents on address lines 38a of DMA bus 38, by way of line LOAD in step 850, and similarly causes data register 308 to place its contents on data lines 38d of DMA bus 38 by way of line WRITE in step 852. The necessary control signals to effect a write operation are also asserted at this time. Operating logic 330 also at this time, in step 854, asserts line DECR to TC register 302 to cause TC register 302 to decrement its contents. Operating logic 330 then, as in the read case, enters the memory busy loop of steps 834, 836, and 838 until either the memory is no longer busy or until the operation is aborted. The DMA transfer of the data read from the source location, stored in data register 308, and written to the destination location, is then complete. Operating logic 330 then in step 856 causes the contents of destination register 304 and source register 308 to be incremented or decremented, via lines INC/DECR, as indicated by bits 300e through 300h in control register 300.

After completion of the write operation to memory, ready logic 320 will evaluate TCINT bit 300l of control register 300 to determine if an interrupt is to be asserted by ready logic 320 on line 312 if the data block to be DMA transferred is complete (i.e., if TC register 302 is at zero). If no interrupt is to be so asserted, control passes back to the reset state at step 800. If an interrupt is to be asserted (as indicated by step 858), line ZERO from TC register 302 is evaluated and if it indicates that the contents of TC register 302 are zero (step 860), ready logic 320 asserts an interrupt on line 312 at step 862, and then proceeds to the reset state. If the contents of TC register 302 are non-zero, control passes to the reset state at step 800 to begin the next DMA transfer operation.

Figure 10:
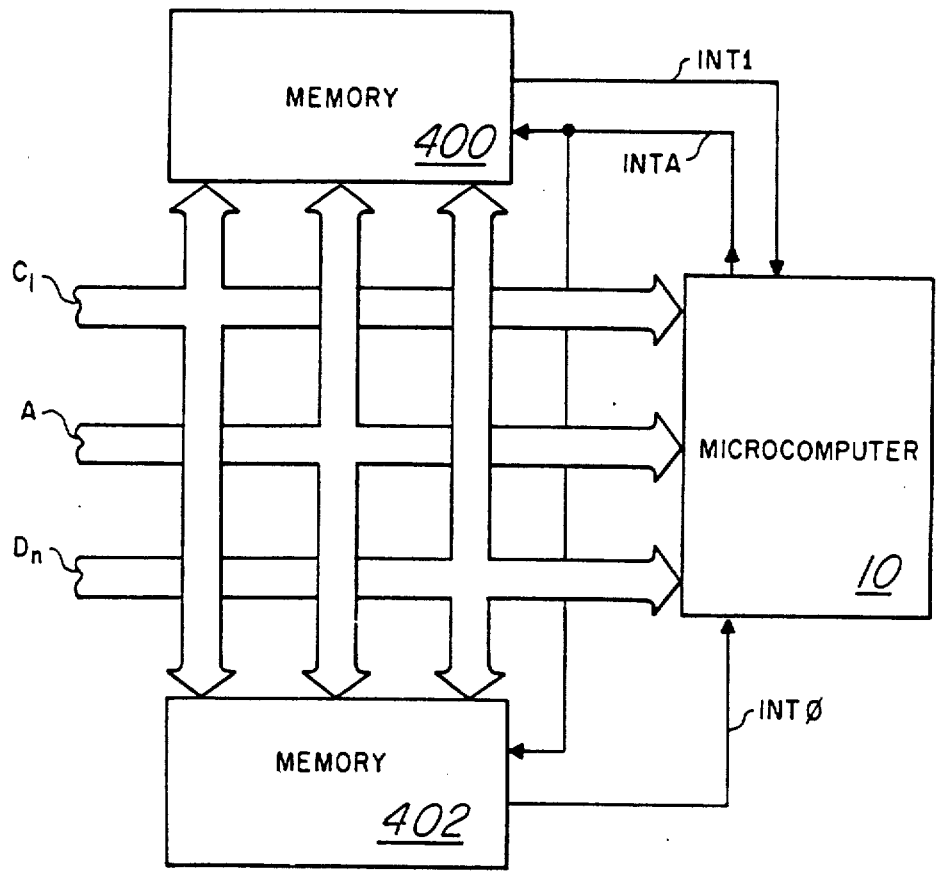
FIG. 10 is an electrical diagram, in block form, of a system incorporating the microcomputer of FIG. 1.

Referring now to FIG. 10, a simple system incorporating microcomputer 10 and external memory is illustrated. Memories 400 and 402 are connected to buses consisting of data lines $D_n$ and address lines $A_n$ controlled by port 24, as shown in FIG. 3. A control bus $C_n$ serves to connect the control signals (such as $RDY_{13}$, HOLD—, HOLDA—, STRB—, and R/W— for control of memories 400 and 402 from port 24, also as shown in FIG. 3. As memories 400 and 402 are so connected to port 24, and are memory-mapped within the address space of microcomputer 10, the DMA transfer described above may occur from, to, or both from and to, external memories 400 and 402. Of course, internal memory such as RAMs 16 and 18 can of course also serve as the source or destination location for a DMA transfer (indeed, ROM 20 may serve as a source), either with a corresponding source or destination in external memories 400 and 402 in internal memory within microcomputer 10. Referring again to FIG. 10, memory 400 is shown as providing a signal on line INT1 to microcomputer 10; memory 400 can thus assert an interrupt for purposes of DMA synchronization as described above, assuming that the corresponding bits are set (and not set) in interrupt enable registers 252 and 253, and assuming that the desired synchronization is set in sync bits 300i/j of control register 300. Similarly, memory 402 can drive line INT0 to microcomputer 10 so as to synchronize it with a DMA operation, as desired.

It is of course also apparent from FIGS. 1 and 3 that other external memories may be connected to microcomputer 10 by way of port 26, and that such other external memories may also serve as source, destination, or both, for a DMA transfer as described above under the control of DMA controller 22.

As is evident from this description, DMA controller 22 is thus operable to transfer the contents of a series of memory locations from the block of memory beginning with the initial source address, to a series of memory locations in a block of memory beginning with the destination address. This operation as described herein does not require the intervention of CPU 12 and, since DMA bus 38 provides a separate address and data path for DMA purposes, can allow such a DMA operation to take place simultaneously with program and data accesses in the normal operation of microcomputer 10. DMA operations can thus occur essentially transparent to the operation of microcomputer 10, greatly enhancing its performance.

It should further be evident from the above description that the use of multiple start bits 300a/b provides for an increased level of control of the DMA operation. Microcomputer 10 can abort the DMA operation at various places throughout the operation (steps 802, 826, 836, and 846, for example). However, the option of aborting the DMA at the end of the current operation (start code 01), allows for the completion of a read cycle once it has begun, allowing the DMA transfer to begin again directly with a write, and without repeating the read cycle. In addition, further flexibility is provided by providing the start code which allows for completion of a complete read/write transfer, further minimizing the necessity of repeated operations if only a full abort is provided.

It should further be evident that the remainder of microcomputer 10 can read status information written by DMA controller 22 in status bits 300c/d by way of peripheral bus 28, as control register 300 is memory-mapped into the address space of microcomputer 10. In addition, the use of system interrupts to synchronize the DMA operation with either or both the source and destination memories removes the need for dedicated interrupt terminals of microcomputer for the operation of DMA synchronization.

Although the invention has been described in detail herein with reference to its preferred embodiment, it is to be understood that this description is by way of example only, and is not to be construed in a limiting sense. It is to be further understood that numerous changes in the details of the embodiments of the invention, and additional embodiments of the invention, will be apparent to, and may be made by, persons of ordinary skill in the art having reference to this description. It is contemplated that such changes and additional embodiments are within the spirit and true scope of the invention as claimed below.

We claim:

1. A microcomputer, comprising:
a central processing unit for performing data processing instructions;
a bus, connected to said central processing units;
a DMA control register connected to said central processing unit for storing a start code of at least two bits; and
a DMA controller, connected to said bus and to said DMA control register, for reading data from said bus by placing a source memory address signal thereupon and receiving data therefrom, and for writing data to said bus by placing a destination memory address signal thereupon and presenting data thereto, said reading and writing repetitively performed constituting a DMA transfer of a block, wherein said DMA controller begins said DMA transfer responsive to a first value of said start code, said DMA controller further operable in selectable ways to stop said DMA transfer including a first way that aborts said DMA transfer upon completion of a next instance of said writing responsive to entry of a second value of said start code into said DMA control register during a read in said DMA transfer, and a second way that aborts said DMA transfer responsive to entry of a third value of said start code.

2. The microcomputer of claim 1, wherein said DMA controller aborts said DMA transfer upon completion of the current reading or writing step responsive to a fourth value of said start code.

3. The microcomputer of claim 1, wherein said DMA control register further is for storing a status code written thereto by said DMA controller, said status code indicating the status of the DMA transfer being performed by said DMA controller.

4. The microcomputer of claim 3, wherein a first value of said status code indicates that said DMA controller has completed the reading of data from said bus.

5. The microcomputer of claim 4, wherein a second value of said status code indicates that said DMA controller has completed the writing of data to said bus.

6. The microcomputer of claim 1, further comprising a memory connected to said bus, which is addressable by an address signal on said bus and which communicates data to and from said bus.

7. The microcomputer of claim 6, further comprising a peripheral port connected to said bus and an external memory connected to said peripheral port.

8. The microcomputer of claim 1, further comprising a peripheral port connected to said bus and an external memory connected to said peripheral port.

9. A data processing system comprising:
a memory;
an external bus connected to said memory; and
a microcomputer, comprising:
a central processing unit for performing data processing instructions;
an internal bus, connected to said central processing unit;
a memory port, connected between said internal bus and said external bus, for communicating address and data signals therebetween;
a DMA control register connected to said central processing unit for storing a start code of at least two bits; and
a DMA controller, connected to said internal bus and to said DMA control register, for reading data from said internal bus by placing a source memory address signal thereupon and receiving data therefrom, and for writing data to said internal bus by placing a destination memory address signal thereupon and presenting data thereto, said reading and writing repetitively performed constituting a DMA transfer of a block, wherein said DMA controller begins said DMA transfer responsive to a first value of said start code, said DMA controller further operable in selectable ways to stop said DMA transfer including a first way that aborts said DMA transfer upon completion of a next instance of said writing responsive to entry of a second value of said start code into said DMA control register during a read in said DMA transfer, and a second way that aborts said DMA transfer responsive to entry of a third value of said start code;

wherein said memory is addressable by said DMA controller.

10. The system of claim 9, wherein said DMA controller aborts said DMA transfer upon completion of the current reading or writing step responsive to a fourth value of said start code.

11. The system of claim 9, wherein said DMA control register further is for storing a status code written thereto by said DMA controller, said status code indicating the status of the DMA transfer being performed by said DMA controller.

12. The system of claim 11, wherein a first value of said status code indicates that said DMA controller has completed the reading of data from said bus.

13. The system of claim 12, wherein a second value of said status code indicates that said DMA controller has completed the writing of data to said bus.

14. The system of claim 9, wherein said microcomputer further comprises an internal memory connected to said internal bus, said internal memory addressable by an address signal on said internal bus.

15. The system of claim 9, further comprising:

an interrupt line, connected between said memory and said microcomputer for communicating an interrupt signal from said memory to said microcomputer;

wherein said microcomputer further comprises:

a central processing unit interrupt enable register, connected to said central processing unit, for storing a CPU interrupt enable code; and a DMA interrupt enable register, connected to said central processing unit, for storing a DMA interrupt enable code;

wherein said DMA control register is further for storing a synchronization code;

and wherein said DMA controller suspends said DMA transfer responsive to a first value of said synchronization code in said DMA control register until an interrupt signal occurs on said interrupt line from said memory when said DMA interrupt enable code and said CPU interrupt enable code represent that the interrupt signal is for said DMA controller and not said central processing unit.

16. The system of claim 15, wherein said DMA controller suspends said DMA transfer until an interrupt signal for said DMA controller occurs on said interrupt line from said memory between reading and writing responsive to said first value of said synchronization code, and alternatively suspends said DMA transfer until an interrupt signal for said DMA controller occurs on said interrupt line from said memory between writing and reading responsive to a second value of said synchronization code.

17. The system of claim 16, wherein said DMA controller suspends said DMA transfer until an interrupt signal for said DMA controller occurs on said interrupt line from said memory between reading and writing and between writing and reading responsive to a third value of said synchronization code.

18. A microcomputer, comprising:

a central processing unit for performing data processing instructions;

an internal bus, connected to said central processing unit;

an interrupt terminal, connected to said central processing unit, for receiving an interrupt signal to said microcomputer;

a CPU interrupt enable register, connected to said central processing unit, for storing a CPU interrupt enable code;

a DMA interrupt enable register, connected to said central processing unit, for storing a DMA interrupt enable code;

a DMA control register for storing a synchronization code; and a DMA controller, connected to said internal bus and to said DMA control register, for reading data from said internal bus by placing a source memory address signal thereupon and receiving data therefrom, and for writing data to said internal bus by placing a destination memory address signal thereupon and presenting data thereto, said reading and writing repetitively performed constituting a DMA transfer of a block, wherein said DMA controller suspends said DMA transfer responsive to a first value of said synchronization code in said DMA control register until an interrupt signal occurs at said interrupt terminal when said DMA interrupt enable code and said CPU interrupt enable code represent that the interrupt signal is for said DMA controller and not said central processing unit.

19. The microcomputer of claim 18, wherein said DMA controller suspends said DMA transfer until an interrupt signal for said DMA controller occurs at said interrupt terminal between reading and writing responsive to said first value of said synchronization code, and alternatively suspends said DMA transfer until an interrupt signal for said DMA controller occurs at said interrupt terminal between writing and reading responsive to a second value of said synchronization code.

20. The microcomputer of claim 19, wherein said DMA controller suspends said DMA transfer until an interrupt signal for said DMA controller occurs at said interrupt terminal between reading and writing and between writing and reading responsive to a third value of said synchronization code.

21. The microcomputer of claim 18, wherein said DMA control register is further for storing a start code of at least two bits; and wherein said DMA controller begins said DMA transfer responsive to a first value of said start code, said DMA controller further operable in selectable ways to stop said DMA transfer including a first way that aborts said DMA transfer upon completion of a next instance of said writing responsive to entry of a second value of said start code into said DMA control register during a read in said DMA transfer, and a second way that aborts said DMA transfer responsive to entry of a third value of said start code.

22. The microcomputer of claim 21, wherein said DMA controller aborts said DMA transfer upon completion of the current reading or writing step responsive to a fourth value of said start code.

23. The microcomputer of claim 21, wherein said DMA control register further is for storing a status code written thereto by said DMA controller, said status code indicating the status of the DMA transfer being performed by said DMA controller.

24. The microcomputer of claim 22, wherein a first value of said status code indicates that said DMA controller has completed the reading of data from said internal bus.

25. The microcomputer of claim 24, wherein a second value of said status code indicates that said DMA controller has completed the writing of data to said internal bus.

26. The microcomputer of claim 21, further comprising a memory connected to said internal bus, which is addressable by an address signal on said internal bus and which communicates data to and from said internal bus.

27. The microcomputer of claim 26, further comprising a peripheral port connected to said internal bus and an external memory connected to said peripheral port.

28. The microcomputer of claim 21, further comprising a peripheral port connected to said internal bus and an external memory connected to said peripheral port.

29. A microcomputer system comprising:
a central processing unit arranged to execute data processing instructions and produce digital signals;
a memory for storing a block of data, the memory connected to said central processing unit;
a peripheral device to which the block of data from said memory is to be transferred; and
a direct memory access (DMA) controller connected to said central processing unit, said memory and said peripheral device, said DMA controller including a DMA control register and a DMA control circuit responsive to a first code entered from the microcomputer system into said DMA control register to start transferring the block, and then upon entry of a second code into the DMA control register during the transfer, to stop the transfer operation within the block in a manner defined by the second code and then start in sequence with a succeeding DMA operation in response to subsequent entry of the first code into the DMA control register.

30. A direct memory access (DMA) controller for use in a microcomputer system having a central processing unit arranged to execute data processing instructions and produce digital signals, memory for storing a block of data and connected to said central processing unit, and a peripheral device to which the block of data from memory is to be transferred, the DMA controller comprising:
a DMA control register; and
a DMA control circuit responsive to a first code entered from the system into said DMA control register to start transferring the block, and then upon entry of a second code into the DMA control register during the transfer, to stop the transfer operation within the block in a manner defined by the second code and then start in sequence with a succeeding DMA operation in response to subsequent entry of the first code into the DMA control register.

31. A DMA controller of claim 30 wherein each of said codes is a two bit code.

32. A DMA controller of claim 30 wherein each of said codes is a multibit code entered into the same bits of said DMA control register.

33. A DMA controller of claim 30 wherein said first code is a start code and said second code defines a DMA abort mode.

34. A DMA controller of claim 30 wherein said second code defines a stop after a current read, whereupon operations start in sequence subsequently with 35. A DMA controller of claim 30 wherein said second code defines a stop upon reaching a DMA write whereupon operations start in sequence subsequently with a read.

36. A DMA controller of claim 30 wherein said DMA controller includes means operative during a current DMA read and responsive to a value of the second code defining a stop upon reaching a DMA write for completing the read and executing the write whence stop occurs.

37. A DMA controller of claim 30 wherein the second code has a first value which defines an unconditional abort of the transfer and a second value alternatively enterable into the DMA control register which defines a stop within the transfer whereupon the transfer is resumed upon entry of the first code.

38. A method of direct memory access (DMA) control of a microcomputer system having a central processing unit arranged to execute data processing instructions and produce digital signals, memory for storing a block of data and connected to the central processing unit, a DMA control circuit with a DMA control register, and peripheral device to which the block of data from the memory is to be transferred, the method comprising the steps of:
entering a first code into the DMA control register to start transferring the block;
entering a second code into the DMA control register during the transfer to stop the transfer operation within the block in a manner defined by the second code; and
starting the transfer again in sequence with a succeeding DMA operation in response to subsequent entry of the first code into the DMA control register.

39. The method of claim 38 wherein each of said codes is a multibit code entered into the same bits of the DMA control register.

40. The method of claim 38 wherein said second code can have a plurality of values defining different aborts of the transfer.

* * * * *